(12) United States Patent
Kanekawa et al.

(10) Patent No.: US 12,275,392 B2
(45) Date of Patent: Apr. 15, 2025

(54) VEHICLE CONTROL DEVICE

(71) Applicant: HITACHI ASTEMO, LTD., Ibaraki (JP)

(72) Inventors: Nobuyasu Kanekawa, Tokyo (JP); Hiroshi Nakano, Tokyo (JP); Atsushi Arata, Ibaraki (JP); Takao Fukuda, Ibaraki (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 296 days.

(21) Appl. No.: 17/777,872

(22) PCT Filed: Jan. 15, 2021

(86) PCT No.: PCT/JP2021/001190
§ 371 (c)(1),
(2) Date: May 18, 2022

(87) PCT Pub. No.: WO2021/192532
PCT Pub. Date: Sep. 30, 2021

(65) Prior Publication Data
US 2023/0076114 A1    Mar. 9, 2023

(30) Foreign Application Priority Data
Mar. 27, 2020    (JP) ................. 2020-057070

(51) Int. Cl.
*B60W 20/50*    (2016.01)
*B60K 6/442*    (2007.10)
(Continued)

(52) U.S. Cl.
CPC ............ *B60W 20/50* (2013.01); *B60K 6/442* (2013.01); *B60K 6/46* (2013.01); *B60K 6/48* (2013.01);
(Continued)

(58) Field of Classification Search
CPC ...... B60W 20/50; B60W 10/02; B60W 10/06; B60W 10/08; B60W 50/029; B60K 6/442; B60K 6/46; B60K 6/48
See application file for complete search history.

(56) References Cited

U.S. PATENT DOCUMENTS

2002/0099487 A1    7/2002  Suganuma et al.
2013/0297125 A1*  11/2013  Syed ................. B60K 6/48
                                              180/65.265
(Continued)

FOREIGN PATENT DOCUMENTS

JP    2002-221075 A    8/2002
JP    2008-302754 A    12/2008
(Continued)

OTHER PUBLICATIONS

Japanese Office Action issued on Feb. 8, 2023 for Japanese Patent Application No. 2020-057070.
(Continued)

*Primary Examiner* — Jelani A Smith
*Assistant Examiner* — Toya Pettiegrew
(74) *Attorney, Agent, or Firm* — Volpe Koenig

(57) ABSTRACT

An object of the present invention is to realize a control device having operation continuity at the time of failure with less redundancy and reduce cost.
Provided is a vehicle control system including a transmission unit that transmits energy to a driving wheel, a first control unit that controls the transmission unit, a first source that inputs energy to the transmission unit, a second source that inputs energy to the transmission unit, a second control unit that controls the first source, and a third control unit that controls the second source, wherein when the first control unit fails, the second control unit or the third control unit controls the transmission unit.

14 Claims, 22 Drawing Sheets

(51) Int. Cl.
  *B60K 6/46* (2007.10)
  *B60K 6/48* (2007.10)
  *B60W 10/02* (2006.01)
  *B60W 10/06* (2006.01)
  *B60W 10/08* (2006.01)
  *B60W 50/029* (2012.01)

(52) U.S. Cl.
  CPC ............ *B60W 10/02* (2013.01); *B60W 10/06* (2013.01); *B60W 10/08* (2013.01); *B60W 50/029* (2013.01)

(56) References Cited

U.S. PATENT DOCUMENTS

| | | | | |
|---|---|---|---|---|
| 2016/0025207 | A1* | 1/2016 | Miyamoto | F16H 57/0435 701/68 |
| 2018/0029473 | A1* | 2/2018 | Nishimura | B60L 3/04 |
| 2018/0046161 | A1 | 2/2018 | Yhr | |
| 2019/0070948 | A1 | 3/2019 | Nishida | |
| 2019/0381996 | A1* | 12/2019 | Kaneko | B60W 20/40 |
| 2020/0086762 | A1* | 3/2020 | Kirchhoffer | B60L 3/0023 |
| 2020/0158039 | A1* | 5/2020 | Aoki | B60W 20/00 |
| 2020/0159180 | A1 | 5/2020 | Ishigooka et al. | |
| 2021/0108719 | A1* | 4/2021 | Tabata | F16H 61/061 |

FOREIGN PATENT DOCUMENTS

| | | |
|---|---|---|
| JP | 2018-016107 A | 2/2018 |
| JP | 2019-043427 A | 3/2019 |
| JP | 2019-073204 A | 5/2019 |
| WO | 2016/156204 A1 | 10/2016 |
| WO | 2018/229930 A1 | 12/2018 |

OTHER PUBLICATIONS

Written Opinion issued on May 18, 2021 for PCT International Application No. PCT/JP2021/001190.

International Search Report issued on May 18, 2021 for PCT International Application No. PCT/JP2021/001190.

\* cited by examiner

FIG. 16

| Case | DIAGNOSIS RESULT | | | | OPERATION | |
|---|---|---|---|---|---|---|
| | 12-1 | 12-2 | 12-3a | 12-3b | | |
| 1 | OK | OK | OK | OK | ECU 10-1 | OPTIMALLY CONTROL POWER (ENERGY) SOURCE 100 BY ENERGY MANAGEMENT. |
| | | | | | ECU 10-2 | OPTIMALLY CONTROL POWER (ENERGY) SOURCE 200 BY ENERGY MANAGEMENT. |
| | | | | | ECU 10-3a | OPERATE HYBRID TRANSMISSION UNIT 300 WITH OUTPUT OF POWER (ENERGY) SOURCES 100 AND 200. |
| | | | | | ECU 10-3b | OPERATE HYBRID TRANSMISSION UNIT 300 WITH OUTPUT OF POWER (ENERGY) SOURCES 100 AND 200. |
| 2 | NG | OK | OK | OK | ECU 10-1 | OUT OF CONTROL→STOP OPERATION OF POWER (ENERGY) SOURCE 100. |
| | | | | | ECU 10-2 | CONTROL POWER (ENERGY) SOURCE 200 BY REQUIRED TORQUE 11. |
| | | | | | ECU 10-3a | OPERATE HYBRID TRANSMISSION UNIT 300 WITH OUTPUT OF POWER (ENERGY) SOURCE 200. |
| | | | | | ECU 10-3b | OPERATE HYBRID TRANSMISSION UNIT 300 WITH OUTPUT OF POWER (ENERGY) SOURCE 200. |
| 3 | OK | NG | OK | OK | ECU 10-1 | CONTROL POWER (ENERGY) SOURCE 200 BY REQUIRED TORQUE 11. |
| | | | | | ECU 10-2 | OUT OF CONTROL→STOP OPERATION OF POWER (ENERGY) SOURCE 200. |
| | | | | | ECU 10-3a | OPERATE HYBRID TRANSMISSION UNIT 300 WITH OUTPUT OF POWER (ENERGY) SOURCE 100. |
| | | | | | ECU 10-3b | OPERATE HYBRID TRANSMISSION UNIT 300 WITH OUTPUT OF POWER (ENERGY) SOURCE 100. |
| 4 | NG | NG | * | * | ECU 10-1 | OUT OF CONTROL→STOP OPERATION OF POWER (ENERGY) SOURCE 100. |
| | | | | | ECU 10-2 | OUT OF CONTROL→STOP OPERATION OF POWER (ENERGY) SOURCE 200. |
| | | | | | ECU 10-3a | STOP OPERATION OF HYBRID TRANSMISSION UNIT 300. |
| | | | | | ECU 10-3b | STOP OPERATION OF HYBRID TRANSMISSION UNIT 300. |
| 5 | OK | OK | NG | OK | ECU 10-1 | OPTIMALLY CONTROL POWER (ENERGY) SOURCE 100 BY ENERGY MANAGEMENT. |
| | | | | | ECU 10-2 | OPTIMALLY CONTROL POWER (ENERGY) SOURCE 200 BY ENERGY MANAGEMENT. |
| | | | | | ECU 10-3a | OUT OF CONTROL→ECU 10-3b OPERATES HYBRID TRANSMISSION UNIT 300 WITH OUTPUT OF POWER (ENERGY) SOURCES 100 AND 200. |
| | | | | | ECU 10-3b | OPERATE HYBRID TRANSMISSION UNIT 300 WITH OUTPUT OF POWER (ENERGY) SOURCES 100 AND 200. |
| 6 | NG | OK | NG | OK | ECU 10-1 | OUT OF CONTROL→STOP OPERATION OF POWER (ENERGY) SOURCE 100. |
| | | | | | ECU 10-2 | CONTROL POWER (ENERGY) SOURCE 200 BY REQUIRED TORQUE 11. |
| | | | | | ECU 10-3a | OUT OF CONTROL→ECU 10-3b OPERATES HYBRID TRANSMISSION UNIT 300 WITH OUTPUT OF POWER (ENERGY) SOURCE 200. |
| | | | | | ECU 10-3b | OPERATE HYBRID TRANSMISSION UNIT 300 WITH OUTPUT OF POWER (ENERGY) SOURCE 200. |
| 7 | OK | NG | NG | OK | ECU 10-1 | CONTROL POWER (ENERGY) SOURCE 200 BY REQUIRED TORQUE 11. |
| | | | | | ECU 10-2 | OUT OF CONTROL→STOP OPERATION OF POWER (ENERGY) SOURCE 200. |
| | | | | | ECU 10-3a | OUT OF CONTROL→ECU 10-3b OPERATES HYBRID TRANSMISSION UNIT 300 WITH OUTPUT OF POWER (ENERGY) SOURCE 100. |
| | | | | | ECU 10-3b | OPERATE HYBRID TRANSMISSION UNIT 300 WITH OUTPUT OF POWER (ENERGY) SOURCE 100. |
| 8 | OK | OK | OK | NG | ECU 10-1 | OPTIMALLY CONTROL POWER (ENERGY) SOURCE 100 BY ENERGY MANAGEMENT. |
| | | | | | ECU 10-2 | OPTIMALLY CONTROL POWER (ENERGY) SOURCE 200 BY ENERGY MANAGEMENT. |
| | | | | | ECU 10-3a | OPERATE HYBRID TRANSMISSION UNIT 300 WITH OUTPUT OF POWER (ENERGY) SOURCES 100 AND 200. |
| | | | | | ECU 10-3b | OUT OF CONTROL→ECU 10-3a OPERATES HYBRID TRANSMISSION UNIT 300 WITH OUTPUT OF POWER (ENERGY) SOURCES 100 AND 200. |
| 9 | NG | OK | OK | NG | ECU 10-1 | OUT OF CONTROL→STOP OPERATION OF POWER (ENERGY) SOURCE 100. |
| | | | | | ECU 10-2 | CONTROL POWER (ENERGY) SOURCE 200 BY REQUIRED TORQUE 11. |
| | | | | | ECU 10-3a | OPERATE HYBRID TRANSMISSION UNIT 300 WITH OUTPUT OF POWER (ENERGY) SOURCE 200. |
| | | | | | ECU 10-3b | OUT OF CONTROL→ECU 10-3a OPERATES HYBRID TRANSMISSION UNIT 300 WITH OUTPUT OF POWER (ENERGY) SOURCE 200. |
| 10 | OK | NG | OK | NG | ECU 10-1 | CONTROL POWER (ENERGY) SOURCE 200 BY REQUIRED TORQUE 11. |
| | | | | | ECU 10-2 | OUT OF CONTROL→STOP OPERATION OF POWER (ENERGY) SOURCE 200. |
| | | | | | ECU 10-3a | OPERATE HYBRID TRANSMISSION UNIT 300 WITH OUTPUT OF POWER (ENERGY) SOURCE 100. |
| | | | | | ECU 10-3b | OUT OF CONTROL→ECU 10-3a OPERATES HYBRID TRANSMISSION UNIT 300 WITH OUTPUT OF POWER (ENERGY) SOURCE 100. |
| 11 | * | * | NG | NG | ECU 10-1 | OUT OF CONTROL→STOP OPERATION OF POWER (ENERGY) SOURCE 100. |
| | | | | | ECU 10-2 | OUT OF CONTROL→STOP OPERATION OF POWER (ENERGY) SOURCE 200. |
| | | | | | ECU 10-3a | STOP OPERATION OF HYBRID TRANSMISSION UNIT 300. |
| | | | | | ECU 10-3b | STOP OPERATION OF HYBRID TRANSMISSION UNIT 300. |

NORMAL STATE

MOTOR ECU FAILS

ENGINE ECU FAILS

NORMAL STATE

BATTERY ECU FAILS

ENGINE GENERATOR ECU FAILS

VEHICLE CONTROL DEVICE

TECHNICAL FIELD

The present invention relates to a control system, and more particularly, to a control system capable of continuing an operation at the time of failure.

BACKGROUND ART

Full automation of control such as automatic driving eliminates human operation, reduces the probability of an accident caused by human error, and can improve safety. In advanced automatic driving, the system is responsible for vehicle control, and thus, a high level of safety is required. As one of the requirements for safety, there is a requirement for fail operation (operation continuity at the time of failure).

This refers to a function of maintaining minimum performance by using a remaining function, rather than immediately stopping the function when one part of the component fails. In the driving control, for example, even if a failure occurs, it is possible to ensure safety as compared with a case where a vehicle immediately stops at a place, by enabling the vehicle to move to a safe place and then stop.

A driving control system that realizes automatic driving includes not only a high-order calculation unit (hereinafter, it is referred to as an "automatic driving control unit") that performs a driving plan but also a low-order calculation unit (hereinafter, referred to as a "drive system control unit") that controls a device that controls a motion of a vehicle, such as an engine, a battery, and a power converter (inverter), under the control of the high-order calculation unit. In order to be able to stop the vehicle after moving it to a safe place even if a failure occurs, a fail operation (operation continuity at the time of failure) of the drive system control unit as well as the automatic driving control unit is required.

Hybrid drive systems in which different power (energy) sources such as an engine and a motor are combined are also widely used from a viewpoint of environmental protection and sustainability of social activities of human beings. In particular, from a viewpoint of automatic driving, series hybrid drive systems will be widely used in the future since they have linear characteristics.

For example, PTL1 discloses the operation continuity at the time of failure of the electronic device that controls the automobile.

CITATION LIST

Patent Literature

PTL1: JP 2018-016107 A

SUMMARY OF INVENTION

Technical Problem

According to PTL1, it is possible to increase the reliability of operation continuity at the time of failure, but it is desirable to further consider cost reduction on the premise of redundancy of the control device.

Therefore, an object of the present invention is to realize a control device having operation continuity at the time of failure with less redundancy and reduce cost.

Solution to Problem

In order to achieve the above object, a vehicle control system according to the present invention includes: a transmission unit that transmits energy to a driving wheel; a first control unit that controls the transmission unit; a first source that inputs energy to the transmission unit; a second source that inputs energy to the transmission unit; a second control unit that controls the first source; and a third control unit that controls the second source, wherein when the first control unit fails, the second control unit or the third control unit controls the transmission unit.

Advantageous Effects of Invention

By considering different power (energy) sources included in the hybrid drive system as redundant power (energy) sources, it is possible to realize a fail-operational hybrid drive system by minimizing redundancy without requiring further redundancy, and it is possible to achieve both implementation of operation continuity at the time of failure and cost reduction.

BRIEF DESCRIPTION OF DRAWINGS

FIG. 16 illustrates an operation example.

DESCRIPTION OF EMBODIMENTS

Hereinafter, embodiments of the present invention will be described with reference to the drawings.

First Embodiment

Figure 1:
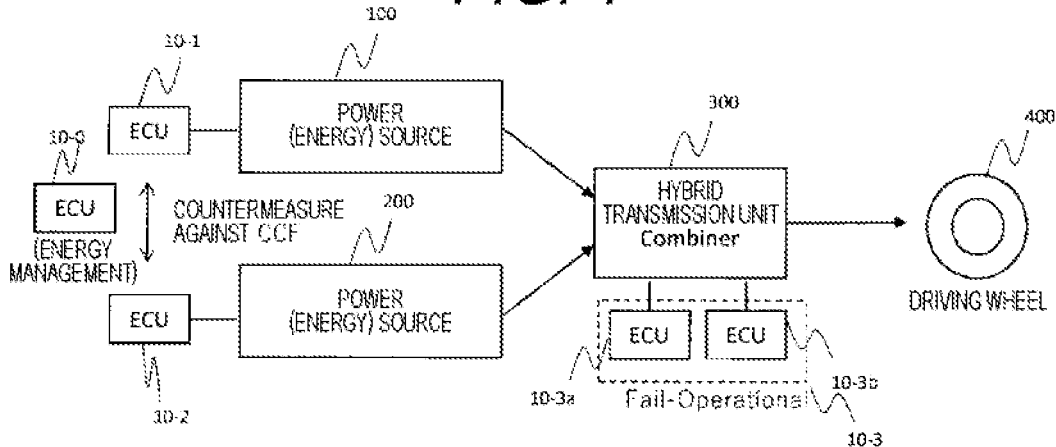
FIG. 1 is a configuration diagram of a first basic embodiment of the present invention.

FIG. 1 is a first basic embodiment of the present invention.

Power (energy) from the different power (energy) sources 100 and 200 is input to a hybrid transmission unit (Combiner) 300, and the hybrid transmission unit 300 mixes power (energy) from the power (energy) sources 100 and 200 and transmits the power (energy) to a driving wheel 400. The hybrid transmission unit 300 is controlled by an electronic control unit ECU 10-3 that is a first control unit. The power (energy) source 100 is controlled by an electronic control unit ECU 10-1 that is a second control unit, and the power (energy) source 100 is controlled by an electronic control unit ECU 10-2 that is a third part. Further, an electronic control unit ECU 10-0, which is a fourth control unit that controls energy management of the entire hybrid drive system, controls a mixing ratio of power (energy) from the power (energy) sources 100 and 200 input to the hybrid transmission unit 300. The above is the configuration of a normal hybrid drive system.

Further, in the present invention, the ECU 10-3 is made fail-operational (operation can be continued at the time of failure). Specifically, as illustrated in FIG. 1, a redundant configuration with the ECU 10-3a and the ECU 10-3b can be considered. The ECU 10-1 and the ECU 10-2 are configured to take countermeasures against a common cause failure and not to lose control functions of both ECUs due to the same failure or failure cause. Specifically, it is conceivable that the housing, the wiring board, and the semiconductor chip of the ECU 10-1 and the ECU 10-2 are physically separated or electrically separated by being operated by separated power source.

Further, in the present invention, at the time of failure of the one power (energy) source (for example, 100) or the control unit of the power (energy) source (for example, the ECU 10-1), the ECU 10-0 controls the hybrid transmission unit 300 to transmit energy to the driving wheel by power (energy) from the other power (energy) source (for example, 200). With the above control, the different power (energy) sources 100 and 200 can be regarded as redundant power (energy) sources, and even if one fails, the other can continue the operation.

According to the present embodiment described above, by focusing on the redundancy inherent in the hybrid drive system, it is possible to make the hybrid drive system fail-operational with less redundancy.

Second Embodiment

Figure 2:
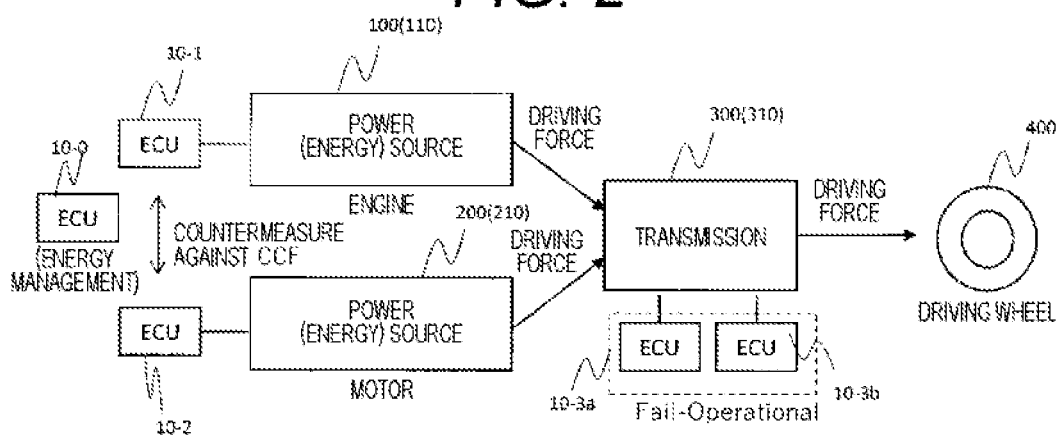
FIG. 2 illustrates an embodiment of a parallel hybrid drive system.
Figure 3:
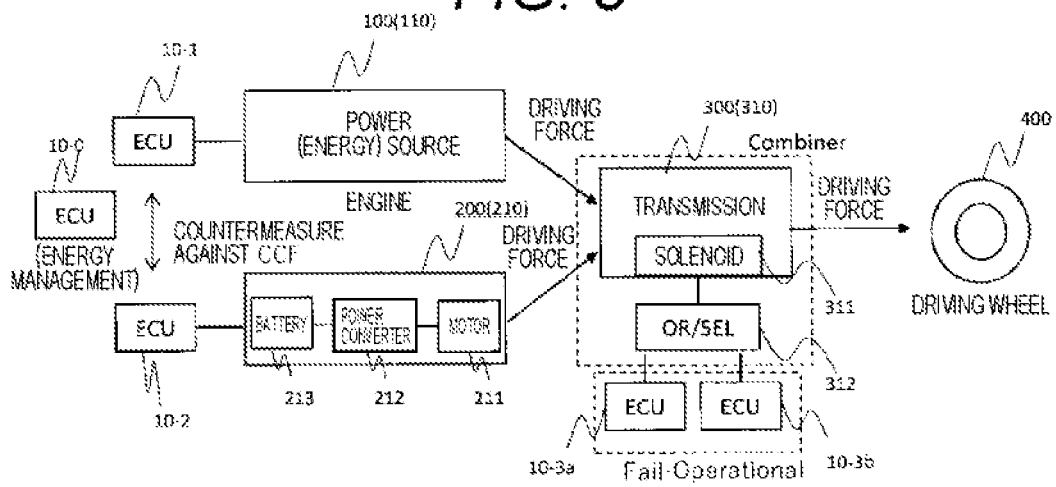
FIG. 3 illustrates an embodiment of a parallel hybrid drive system.

FIG. 2 illustrates an embodiment in which the present invention is applied to a parallel hybrid drive system. An engine 110 is provided as a power (energy) source 100 in the embodiment of FIG. 1, a power (energy) source 210 including a motor is provided as a power (energy) source 200, and a transmission 310 is provided as a hybrid transmission unit 300. In the present embodiment, a power (energy) source 210 including a motor includes a motor (or a motor generator) 211, a power converter 212, and a battery 213. Driving force from the engine 110 and the motor 211 is input to a transmission 310. In the transmission 310, driving force from the engine 110 and the motor 211 is mixed at an appropriate reduction ratio by a gear, a clutch, or the like. In many cases, an output shaft connected to the engine 110, the motor 211, and the driving wheel is coupled via a transmission, and the driving force of the engine 110, the motor 211, or both is transmitted to the output shaft by a clutch inserted therebetween. In the present embodiment, the ECU 10-3a and the ECU 10-3b that control the transmission 310 are redundantly provided, but as illustrated in FIG. 3, in the case of a single system where a solenoid 311 that drives a hydraulic valve of the transmission 310 is not redundantly provided, the solenoid 311 is driven via an OR or selector circuit 312 by control signals from the redundant ECU 10-3a and ECU 10-3b.

Figure 4:
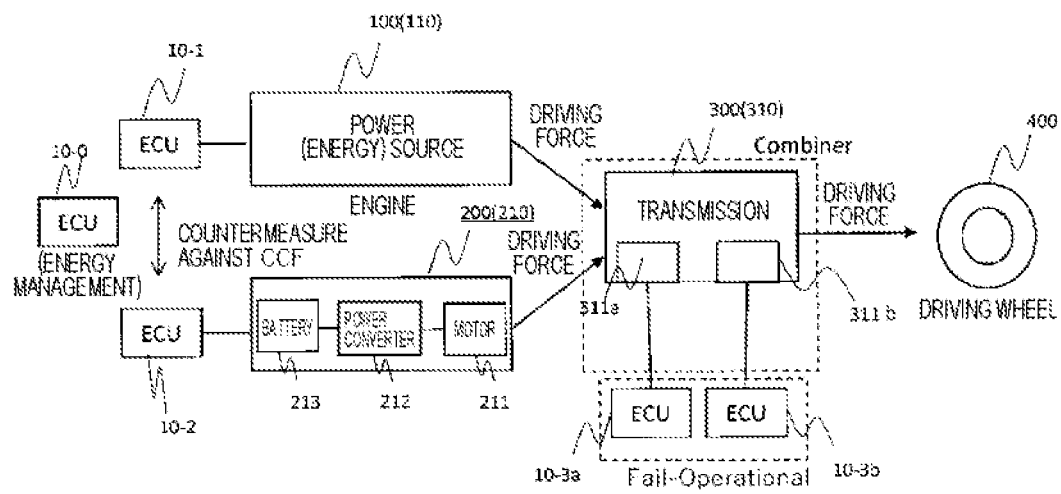
FIG. 4 illustrates an embodiment of a parallel hybrid drive system.

As illustrated in FIG. 4, when solenoids 311a and 311b are redundantly provided, the redundant ECU 10-3a and ECU 10-3b can drive the solenoids 311a and 311b, respectively. Note that an OR or selector circuit can be configured by a hydraulic circuit inside the transmission 310 (not illustrated).

Note that, in order that the motor (or motor generator) 211 can perform not only driving but also regenerative braking, the power converter (inverter) 211 desirably has not only a simple inverter function but also a four-quadrant conversion function capable of converting electric power generated by the output-side motor operating as a generator into DC electric power and returning the DC electric power to the battery 213 at the time of deceleration.

Figure 5:
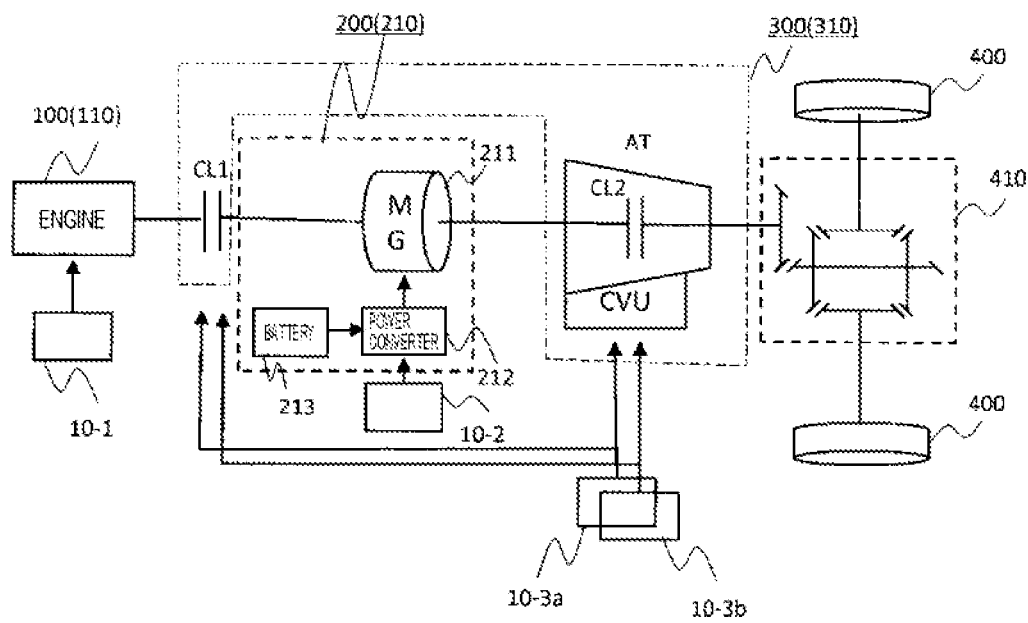
FIG. 5 illustrates a more detailed embodiment of a parallel hybrid drive system.

FIG. 5 is a more detailed embodiment of the parallel hybrid drive system.

The driving force output of the engine 110 is input to the automatic transmission AT via a clutch CL1 and the motor (or motor generator) 211. The automatic transmission AT includes a clutch CL2 and is controlled by a control valve unit CVU. The driving force from the automatic transmission AT is supplied to the driving wheel 400, and it is desirable that the driving force passes through a speed difference (difference in rotation speed) differential gear 410 to the inner and outer wheels when the vehicle turns a curve.

The clutch CL1 is engaged to transmit the driving force of the engine 110 to the driving wheel 400 when the driving wheel 400 is driven by the engine 110, and is disconnected so that the engine 110 does not load the motor (or the motor generator) 211 when the driving wheel 400 is driven by the motor (or the motor generator) 211. When SoC of the battery 213 decreases, the clutch CL2 generates electric power by the driving force motor (or motor generator) 211 of the engine 110 when the vehicle is stopped. As the clutch CL2, an example is shown in which one of the friction fastening elements incorporated in the automatic transmission AT is used. An example in which an independent clutch CL2 is disposed between the motor generator MG and the automatic transmission AT and an example in which an independent clutch CL2 is disposed between the automatic transmission AT and the driving wheel 400 are also conceivable.

Figure 6:
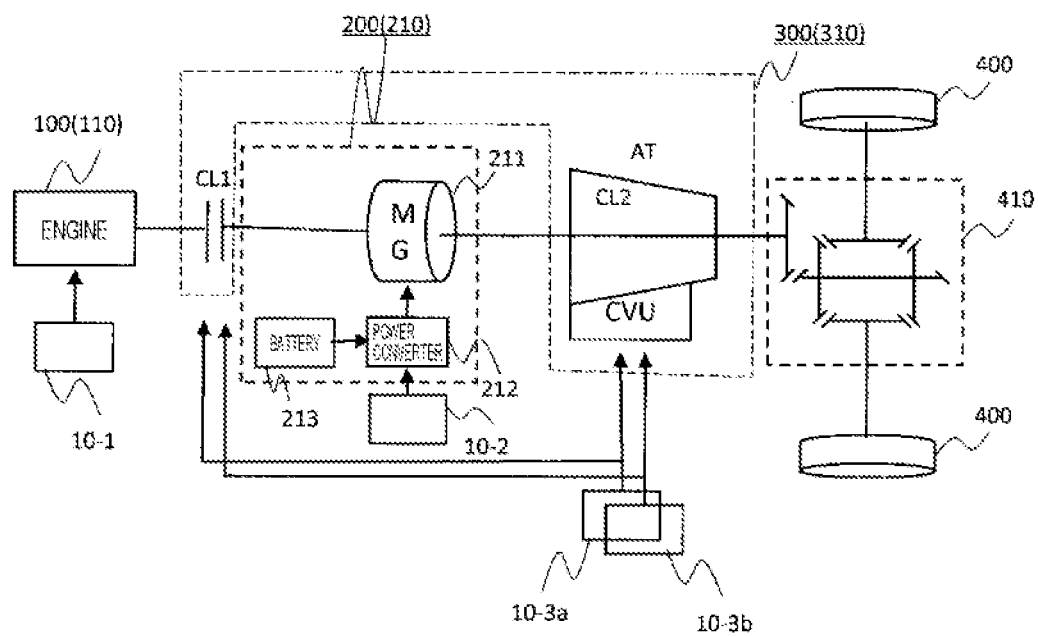
FIG. 6 illustrates a more detailed embodiment of a parallel hybrid drive system.

In addition, the clutch CL2 can be omitted as illustrated in FIG. 6, if the operation of generating electric power by the driving force motor (or motor generator) 211 of the engine 110 is not performed when the vehicle is stopped.

In the present embodiment, since the automatic transmission AT, and the clutch CL1 (or the clutch CL2 in the embodiment of FIG. 5) correspond to the hybrid transmission unit 300, these elements are controlled by redundant ECUs 10-3a and 10-3b.

Third Embodiment

Figure 7:
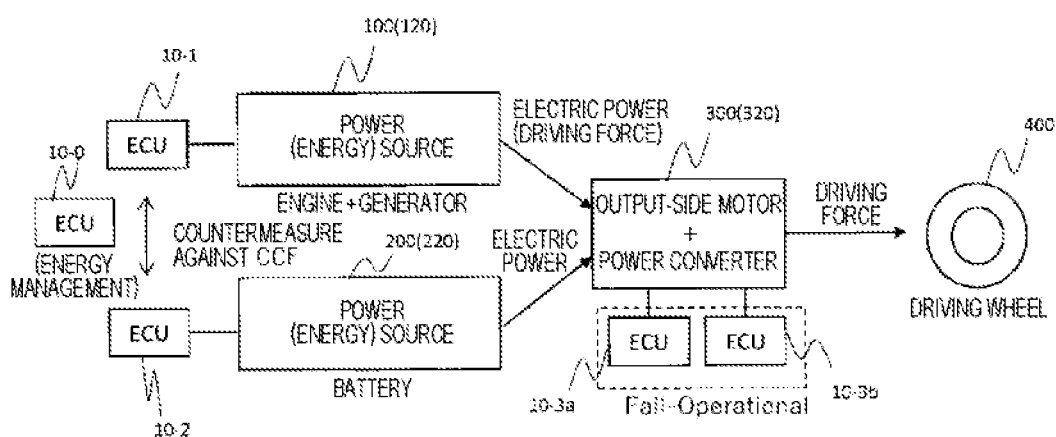
FIG. 7 illustrates an embodiment of a series hybrid drive system and a series parallel hybrid drive system.

FIG. 7 illustrates an embodiment in which the present invention is applied to a series hybrid drive system or a series parallel hybrid drive system. An engine-generator 120 is provided as a power (energy) source 100 in the embodiment of FIG. 1, a battery 220 is provided as a power (energy) source 200, and an output-side motor (+ power converter (inverter)) 320 is provided as a hybrid transmission unit 300. The engine-generator 120 includes an engine 121, a generator 122, and a power converter 123, and the output-side motor (+ power converter (inverter)) 320 includes an output-side motor (or motor generator) 321 and a power converter (inverter) 322.

Figure 8:
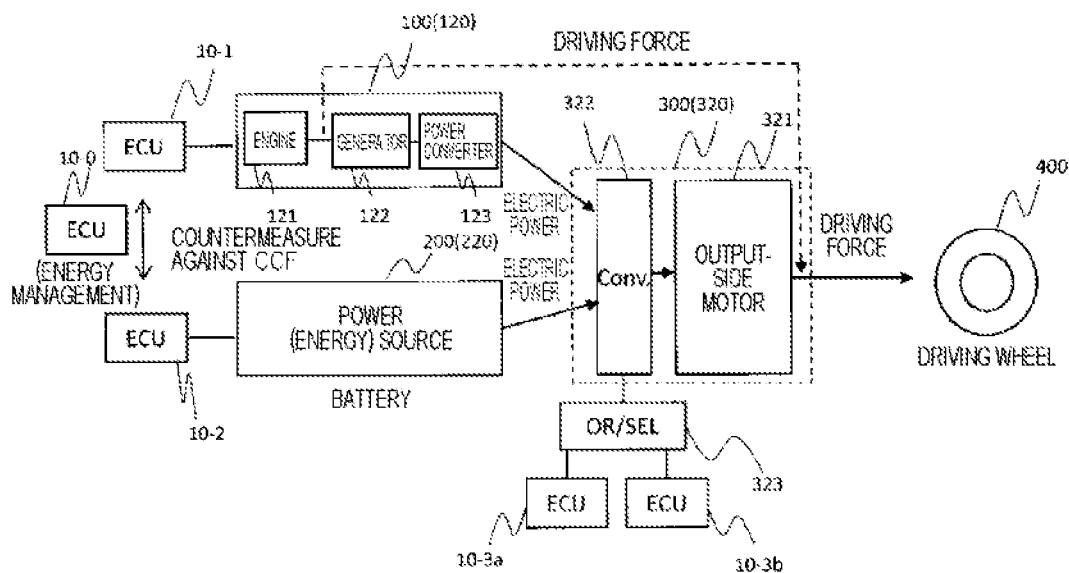
FIG. 8 illustrates an embodiment of a series hybrid drive system and a series parallel hybrid drive system.
Figure 9:
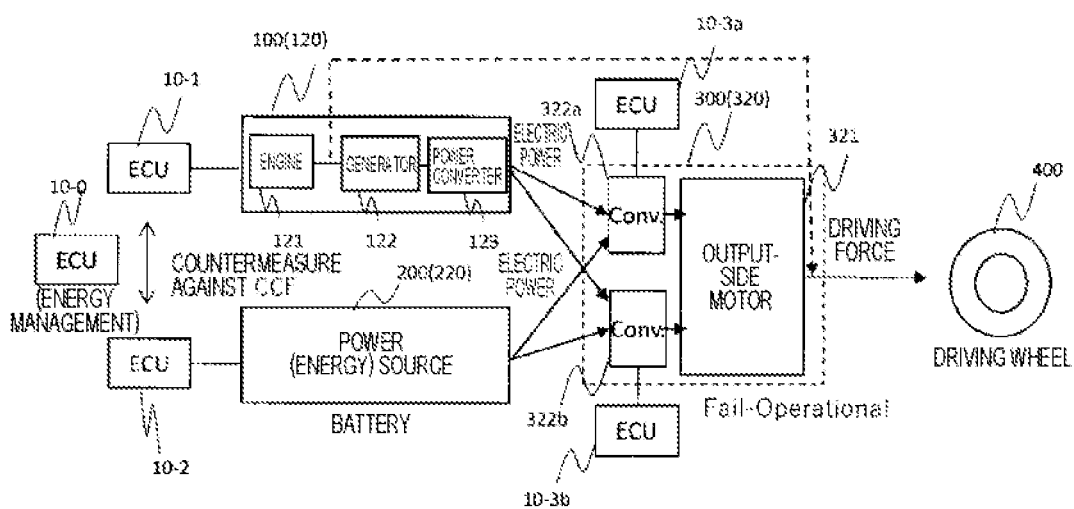
FIG. 9 illustrates an embodiment of a series hybrid drive system and a series parallel hybrid drive system.

In the inner series hybrid drive system of the present embodiment, as illustrated in FIGS. 8 and 9, power (direct current) from the engine-generator 120 and the battery 220 is input to the power converter (inverter) 322, the power converter (inverter) 322 outputs a three-phase alternating current synchronized with one magnetic pole of the output-side motor 321 to drive the output-side motor 321, and the output-side motor 321 drives the driving wheel 400.

In the series parallel hybrid drive system, in addition to the electric power from the engine-generator 120, the driving force from the engine 121 is also input to the output-side motor 321. Specifically, a rotating shaft of the engine 121 is connected to a rotating shaft of the output-side motor 321, and the driving force generated by the output-side motor 321 and the driving force generated by the engine 121 are combined to drive the driving wheel 400.

Note that, in order that the output-side motor 321 can perform not only driving but also regenerative braking, the power converter (inverter) 322 desirably has not only a simple inverter function but also a four-quadrant conversion function of converting electric power obtained when the output-side motor (or motor generator) 321 operates as a generator into DC electric power and returning the DC electric power to the battery 220 at the time of deceleration.

In the present embodiment, the ECU 10-3a and the ECU 10-3b that control the output-side motor (+ power converter (inverter)) 320 are redundantly provided, but as illustrated in FIG. 8, in the case of a single system where the power converter (inverter) 322 that drives the output-side motor 321 is not redundantly provided, the power converter (inverter) 322 is driven via the OR or selector circuit 323 by control signals from the redundant ECU 10-3a and ECU 10-3b. In addition, as illustrated in FIG. 9, in a case where the power converters (inverters) 322a and 322b are redundantly provided, the redundant ECU 10-3a and ECU 10-3b drive the power converters (inverters) 322a and 322b, respectively. Note that windings inside the output-side motor 321 (not illustrated) can also be made redundant.

Further, the power from the engine-generator 120 and the battery 220 may be supplied to the power converter (inverter) 321 or the power converters (inverters) 322a and 322b via a diode OR (not illustrated), and the engine-generator 120, the battery 220, and the power converters (inverters) 322a and 322b may be connected to a common bus. In the former case, in the embodiment (see FIG. 9) having the plurality of power converters (inverters) 322a and 322b, there is also a method of fixing a combination of the power (energy) source and the power converter (inverter), for example, supplying the power of the engine-generator 120 to the power converter (inverter) 322a and supplying the power from the battery 220 to the power converter (inverter) 322b. In the latter case, since SoC of the battery 220 is controlled by the output voltage of the engine-generator 120 and the output voltages of the power converters (inverters) 322a and 322b during regeneration, the ECU 10-2 estimates the SoC of the battery 220, and the ECU 10-0 outputs a command value of the output voltage of the engine-generator 120 to the ECU 10-1 and the output voltages of the power converters (inverters) 322a and 322b during regeneration to the ECUs 10-3a and 10-3b. In addition to the above, the ECU 10-2 protects the battery 220 by opening a contactor (switch) connecting the battery 220 and a bus when the SoC of the battery 220 is abnormal.

Figure 10:
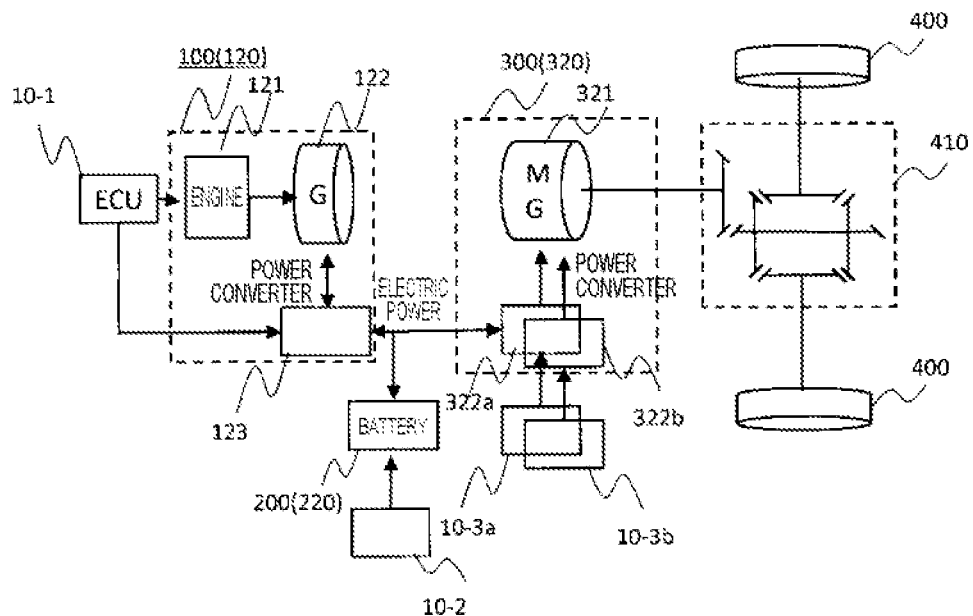
FIG. 10 illustrates a more detailed embodiment of a series hybrid drive system.

FIG. 10 is a more detailed embodiment in which the present invention is applied to a series hybrid drive system (including a range extender). A drive output shaft of the engine 121 is mechanically connected to the generator 122, and a power terminal of the generator 122 is connected to the battery 220 and the power converters (inverters) 322a and 322b via the power converter 123. The power converters (inverters) 322a and 322b convert power (direct current) from the power converter 123 and the battery 220 into three-phase alternating current power to drive the output-side motor (or motor generator) 321.

Figure 11:
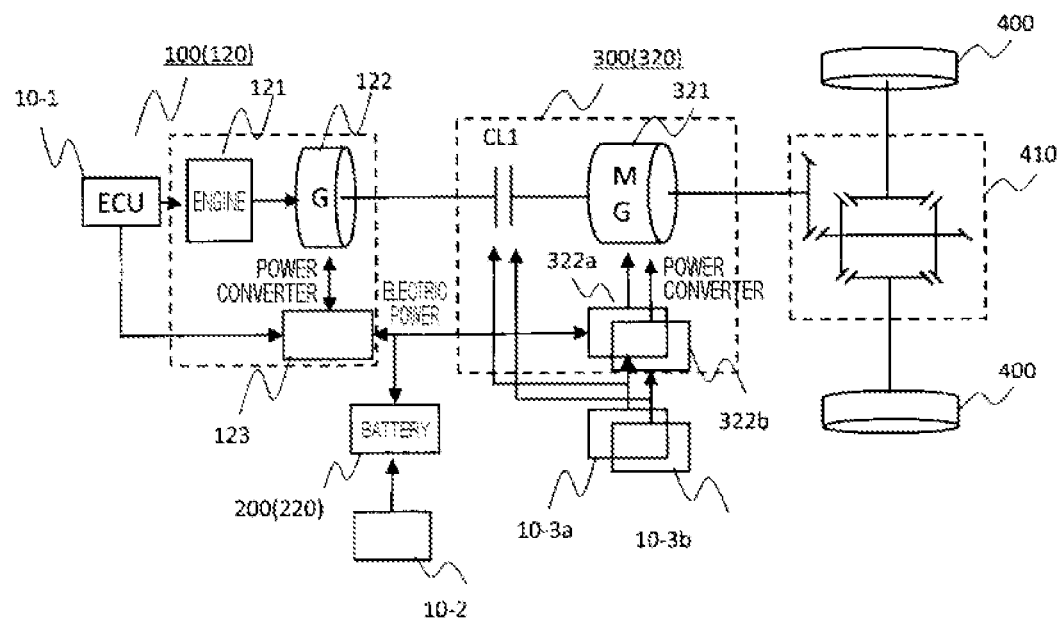
FIG. 11 illustrates a more detailed embodiment of a series hybrid drive system.

As illustrated in FIG. 11, by mechanically connecting a drive output shaft that mechanically connects the engine 121 and the generator 122 to a drive output shaft of the output-side motor (or motor generator) 321 via the clutch CL1, the drive output of the engine is directly transmitted to the driving wheel 400 at the time of high load, so that it is also possible to eliminate the conversion loss caused by once converting the drive output into electric power with the generator 122, the power converter 123, the power converters (inverters) 322a and 322b, and the output-side motor (or motor generator) 321.

In the present embodiment, since the output-side motor (or motor generator) 321, and the power converters (inverters) 322a and 322b (and the clutch CL1 in the embodiment of FIG. 11) correspond to the hybrid transmission unit 300, these elements are controlled by the redundant ECUs 10-3a and 10-3b.

Figure 12:
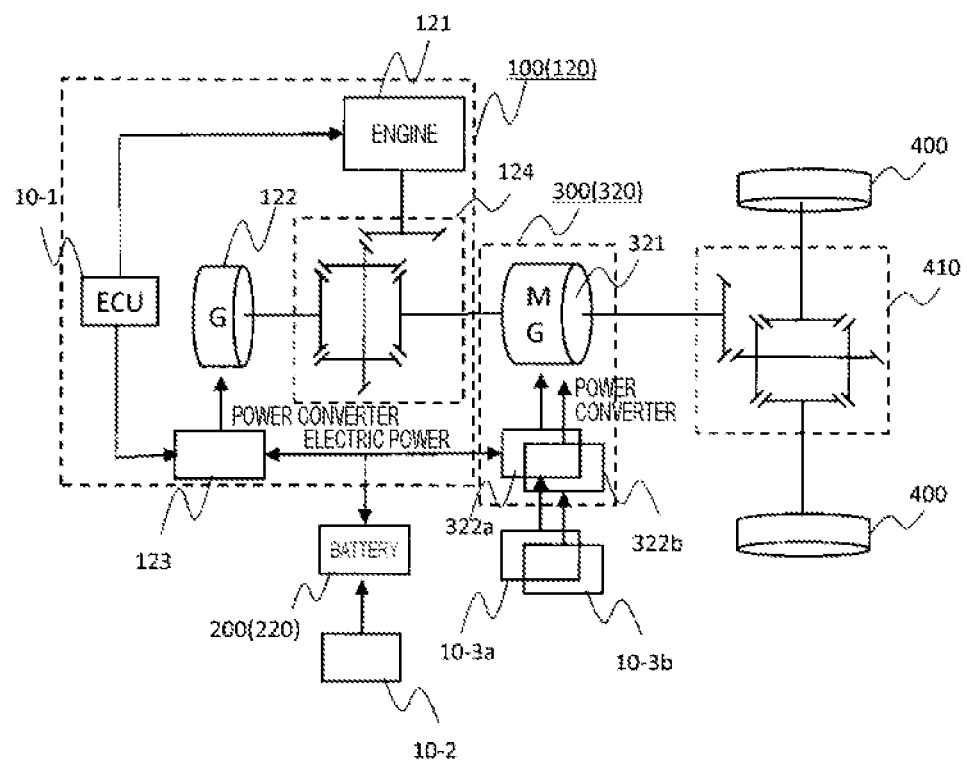
FIG. 12 illustrates a more detailed embodiment of a series parallel hybrid drive system.

FIG. 12 is a more detailed embodiment in which the present invention is applied to a series parallel hybrid drive system. The drive output of the engine 121 is mechanically transmitted to the generator 122 and the hybrid transmission unit 300 via a power distribution mechanism 124. The output of the generator 122 is electrically transmitted to the battery 220 and the power converters 322a and 322b in the hybrid transmission unit 300 (320) via the power converter 123.

In the hybrid transmission unit 300 (320), the drive output of the engine 121 transmitted via the power distribution mechanism 124 is mechanically connected to the output shaft of the output-side motor (or motor generator) 321, and the output-side motor (or motor generator) 321 drives the driving wheel 400. Further, the power converters 322a and 322b convert power (direct current) supplied from the power converter 123 and the battery 220 into three-phase alternating current to drive the output-side motor (or motor generator) 321.

Figure 13:
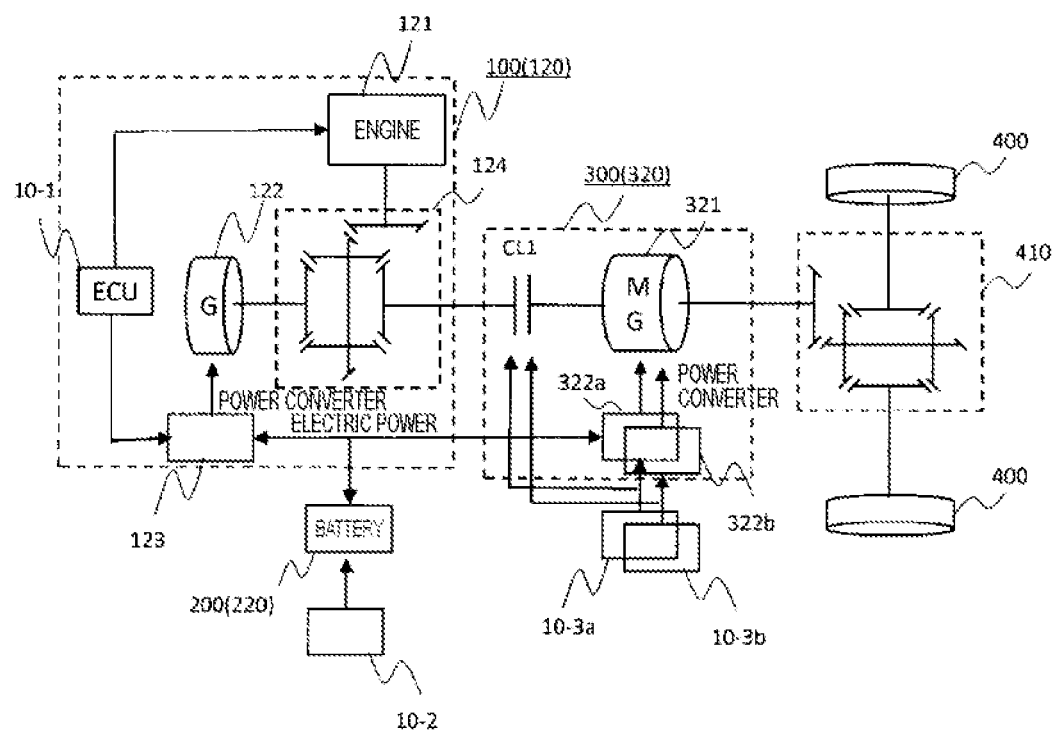
FIG. 13 illustrates a more detailed embodiment of a series parallel hybrid drive system.

Furthermore, as illustrated in FIG. 13, by mechanically connecting the power distribution mechanism 124 and the output shaft of the output-side motor (or motor generator) 321 via the clutch CL1, the engine 121 is disconnected by the clutch CL1 at high speed with a light load during cruise, so that it is possible to prevent the engine 121 from becoming a load and reduce the loss.

There are various implementation methods of the power distribution mechanism 124, and for example, a method of using a differential gear in the power distribution mechanism 124, a method of using a planetary gear in JP H09-100853 A, and a method of using a motor including a plurality of rotors in WO 2008/018539 are shown.

In the present embodiment, since the output-side motor (or motor generator) 321, and the power converters (inverters) 322a and 322b (and the clutch CL1 in the embodiment of FIG. 13) correspond to the hybrid transmission unit 300, these elements are controlled by the redundant ECUs 10-3a and 10-3b.

As described above, according to the present invention, in the parallel hybrid drive system, the series hybrid drive system, and the series parallel hybrid drive system, the ECU that controls the portion corresponding to the hybrid transmission unit 300 is made redundant with the ECUs 10-3a and 10-3b, so that the operation of the entire drive system can be continued even at the time of failure.

Fourth Embodiment

Figure 14:
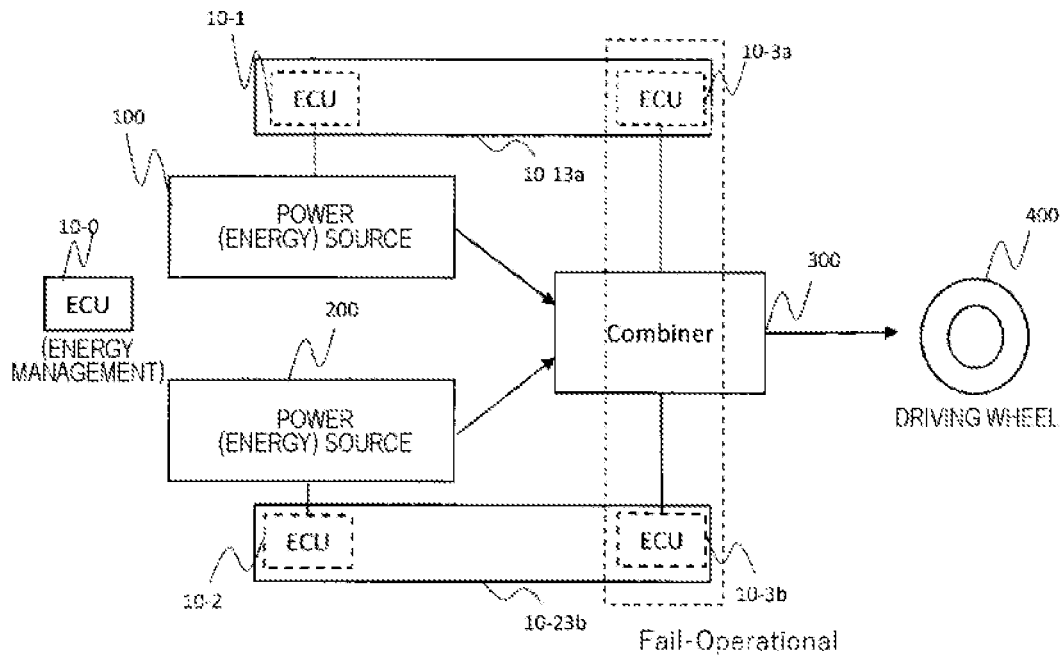
FIG. 14 illustrates an embodiment in which an ECU is integrated.

FIG. 14 illustrates an embodiment in which the ECUs are integrated, and is an embodiment in which the ECU 10-1 and the ECU 10-3a, and the ECU 10-2 and the ECU 10-3b are configured by a common housing, a wiring board, a semiconductor chip, and the like. According to the present embodiment, since the ECU 10-1 and the ECU 10-2 are configured by separate housings, wiring boards, semiconductor chips, and the like, it is possible to reduce the occurrence of a common cause failure between both ECUs. Further, since the ECU 10-3a and the ECU 10-3b configured redundantly are also configured by separate housings, wiring boards, chips, and the like, it is possible to reduce the occurrence of a common cause failure between the two and to enhance the effect of redundancy.

Fifth Embodiment

Figure 15:
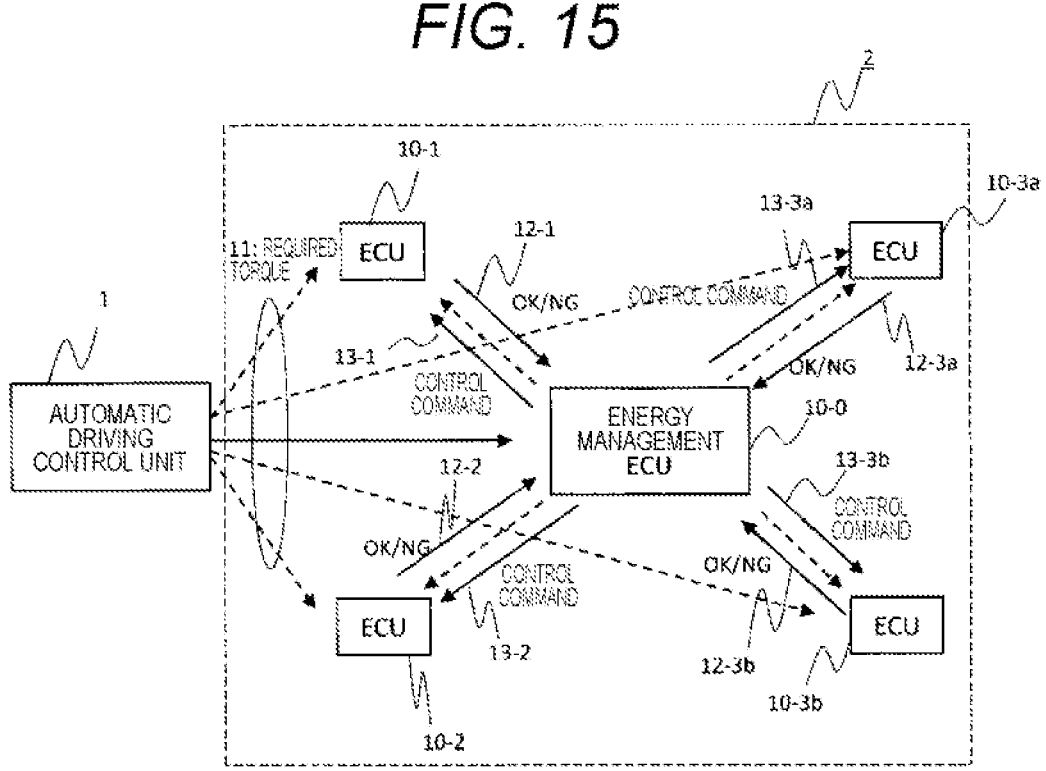
FIG. 15 illustrates an embodiment of a signal flow between ECUs.

FIG. 15 illustrates a signal flow between the ECUs. The energy management ECU 10-0 outputs control commands 13-1, 13-2, 13-3a, and 13-3b to the ECUs 10-1, 10-2, 10-3a, and 10-3b respectively, based on a required torque 11 from the automatic driving control unit 1.

The feature of the present invention is that the energy management ECU 10-0 outputs the control commands 13-1, 13-2, 13-3a, and 13-3b based on the diagnosis results (OK/NG) 1.2-1, 12-2, 12-3a, and 12-3b from the ECUs 10-1, 10-2, 10-3a, and 10-3b. That is, at the time of failure of the one power (energy) source (for example, 100) or the control unit of the power (energy) source (for example, the ECU 10-1) (for example, when the diagnosis result 12-1 is NG), the ECU 10-0 controls the hybrid transmission unit 300 to transmit energy to the driving wheel by power (energy) from the other power (energy) source (for example, 200).

The ECUs 10-1, 10-2, 10-3a, and 10-3b have a diagnosis function, and determine whether the ECUs 10-1, 10-2, 10-3a, and 10-3b are normal or abnormal, and the power (energy) sources 100 and 200 and the hybrid transmission unit 300, which are control targets, are normal or abnormal by the diagnosis function, and send the diagnosis results (OK/NG) 12-1, 12-2, 12-3a, and 12-3b to the energy management ECU 10-0.

When the energy management ECU 10-0 fails, the diagnosis result (OK/NG) 120 of the energy management ECU is sent to each of the ECUs 10-1, 10-2, 10-3a, and 10-3b, and each of the ECUs 10-1, 10-2, 10-3a, and 10-3b operates as in the embodiment illustrated in FIGS. 17 to 26 based on the required torque 11 from the automatic driving control unit 1.

Next, an operation in each case is illustrated in FIG. 16.

Case 0: when the diagnosis results 12-1, 12-2, 12-3a, and 12-3b are all OK, the ECUs 10-1 and 10-2 are caused to optimally control the power (energy) sources 100 and 200, respectively, by energy management, and the ECU 10-3a and the ECU 10-3b are caused to perform control to operate the hybrid transmission unit 300 by the outputs of the power (energy) sources 100 and 200.

Case 1: when only the diagnosis result 12-1 is NG and the others are OK, the ECU 10-1 is caused to stop the operation of the power (energy) source 100 because of uncontrollability, and the ECU 10-2 is caused to perform control the power (energy) source 200 by the required torque 11. Further, the ECU 10-3a and the ECU 10-3b are caused to perform control to operate the hybrid transmission unit 300 by the output of the power (energy) source 200.

Case 4: when the diagnosis results 12-1 and 2 are NG, the ECUs 10-1 and 2 are uncontrollable and thus are caused to stop the operations of the power (energy) sources 100 and 200, and the ECU 10-3a and the ECU 10-3b are caused to stop the operation of the hybrid transmission unit 300.

Case 5: when only the diagnosis result 12-3a is NG and the others are OK, the ECUs 10-1 and 10-2 are caused to optimally control the power (energy) sources 100 and 200, respectively, by energy management, and the ECU 10-3*b* is caused to perform control to operate the hybrid transmission unit 300 by the outputs of the power (energy) sources 100 and 200.

Figure 17:
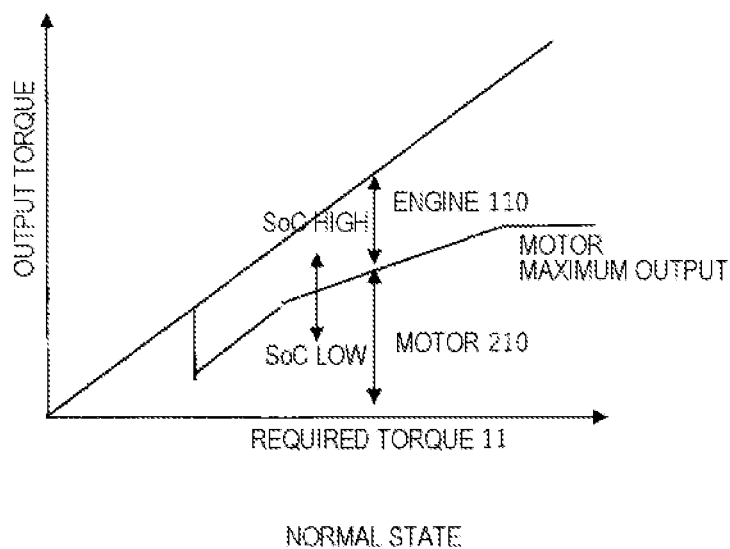
FIG. 17 illustrates an example of operation of a parallel hybrid drive system.
Figure 18:
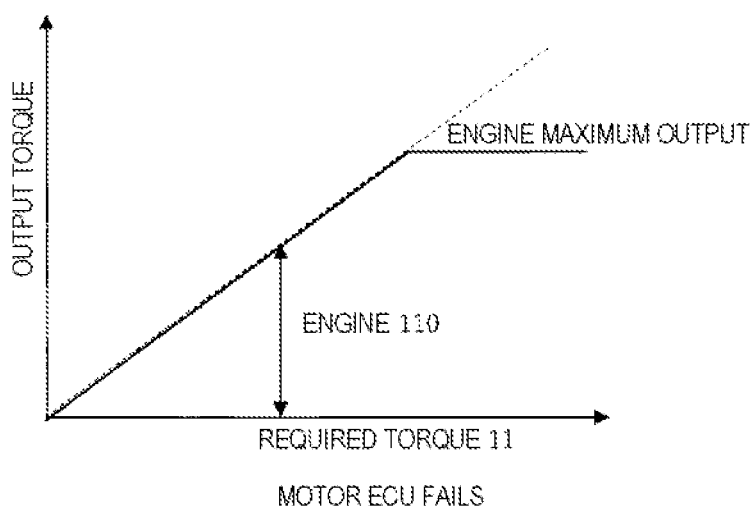
FIG. 18 illustrates an example of operation of a parallel hybrid drive system.
Figure 19:
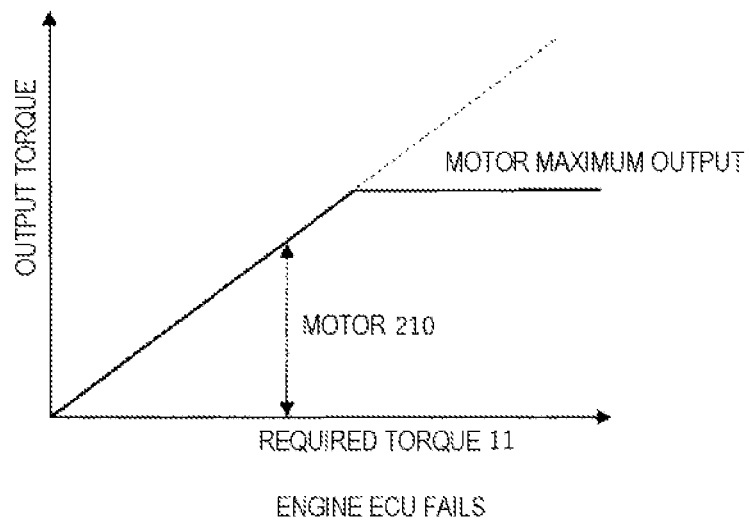
FIG. 19 illustrates an example of operation of a parallel hybrid drive system.

FIGS. 17 to 19 illustrate an example of the operation of the parallel hybrid drive system. In a normal state, as illustrated in FIG. 17, control is performed such that output torques of the engine 110 and the motor 210 are optimally distributed in accordance with the required torque 11 in consideration of the SoC of the battery 213 and the like, and output torque is output from the hybrid transmission unit 300.

When the motor 210 or the ECU 10-2 fails, as illustrated in FIG. 18, the engine 110 performs control to output the output torque from the hybrid transmission unit 300 according to the required torque 11. In this case, since regenerative braking by the motor 210 is impossible, braking torque is generated by a mechanical brake or an engine brake using the engine 110 at the time of braking. For safety, braking by a mechanical brake with simple control is desirable.

Subsequently, when the engine 110 or the ECU 10-1 fails, as illustrated in FIG. 19, the motor 210 performs control to output the output torque from the hybrid transmission unit 300 according to the required torque 11. In this case, since the regenerative braking by the motor 210 is possible, the regenerative braking by the motor 210 and the mechanical brake are cooperatively operated at the time of braking to generate the braking torque. For safety, braking by a mechanical brake with simple control is desirable.

Further, at the time of failure of the ECU 10-0, the ECU 10-1, the ECU 10-2, the ECU 10-3*a*, and the ECU 10-3*b* may determine and perform an operation fixed to either one of FIGS. 18 and 19, respectively, based on the required torque instructed by the automatic driving control unit 1 in the automatic driving vehicle and by an accelerator pedal opening degree of the driver in the conventional manual driving vehicle.

Figure 20:
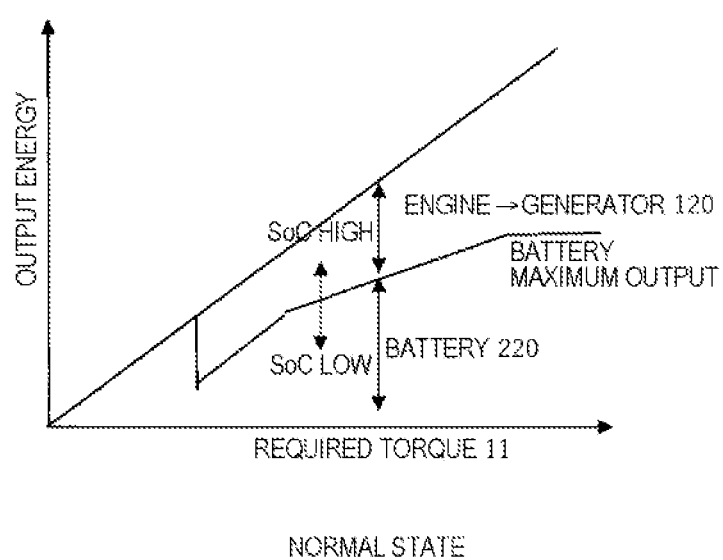
FIG. 20 illustrates an example of operation of a series hybrid drive system.
Figure 21:
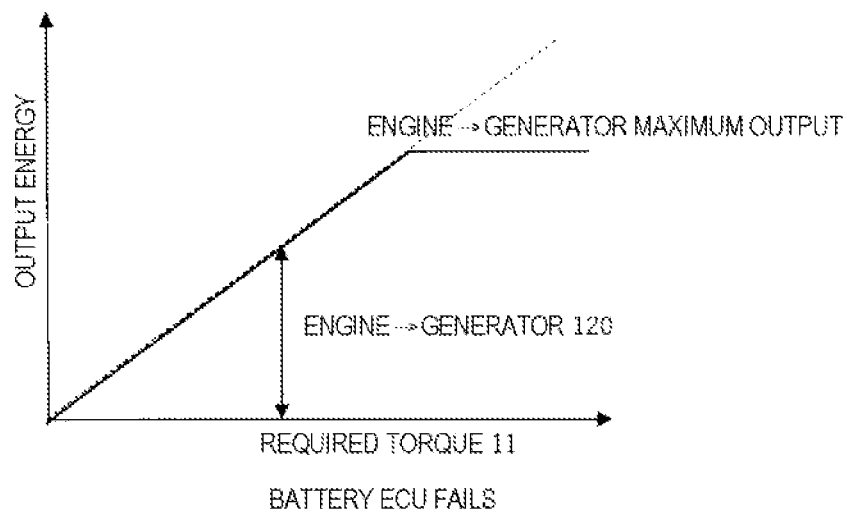
FIG. 21 illustrates an example of operation of a series hybrid drive system.
Figure 22:
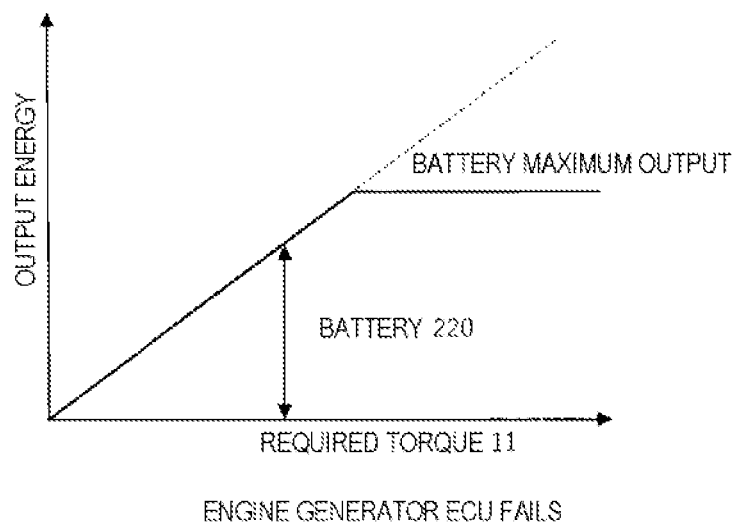
FIG. 22 illustrates an example of operation of a series hybrid drive system.

FIGS. 20 to 22 illustrate an example of the operation of the series hybrid drive system and the series parallel hybrid drive system. In a normal state, as illustrated in FIG. 20, control is performed such that power energy from the engine-generator 120 and the battery 220 is optimally distributed in accordance with the required torque 11 in consideration of the SoC of the battery 220 and the like, and output energy (torque) is output from the hybrid transmission unit 300.

When the battery 220 or the ECU 10-2 fails, as illustrated in FIG. 21, control is performed such that output energy (torque) is output from the hybrid transmission unit 300 by the power energy from the engine-generator 120 according to the required torque 11. In this case, since the battery 220 cannot absorb the regenerative power, energy is absorbed by a mechanical brake or an engine brake using the engine 121 at the time of braking. In order to absorb energy by the engine brake, a method of turning the engine 121 by engaging the clutch CL1 or turning the engine 121 by operating the generator 122 as a motor via the power converter 123 with regenerative power by the motor 321 is conceivable. For safety, braking by a mechanical brake with simple control is desirable.

When engine-generator 120 or the ECU 10-1 fails, as illustrated in FIG. 22, control is performed such that output energy (torque) is output from the hybrid transmission unit 300 by the power energy from the battery 220 according to the required torque 11. In this case, since the regenerative power can be absorbed by the battery 220, the regenerative braking by the motor 321 and the mechanical brake are cooperatively operated at the time of braking to generate the braking torque. For safety, braking by a mechanical brake with simple control is desirable.

Further, at the time of failure of the ECU 10-0, the ECU 10-1, the ECU 10-2, the ECU 10-3*a*, and the ECU 10-3*b* may determine and perform an operation fixed to either one of FIGS. 21 and 22, respectively, based on the required torque instructed by the automatic driving control unit 1 in the automatic driving vehicle and by an accelerator pedal opening degree of the driver in the conventional manual driving vehicle.

Figure 23:
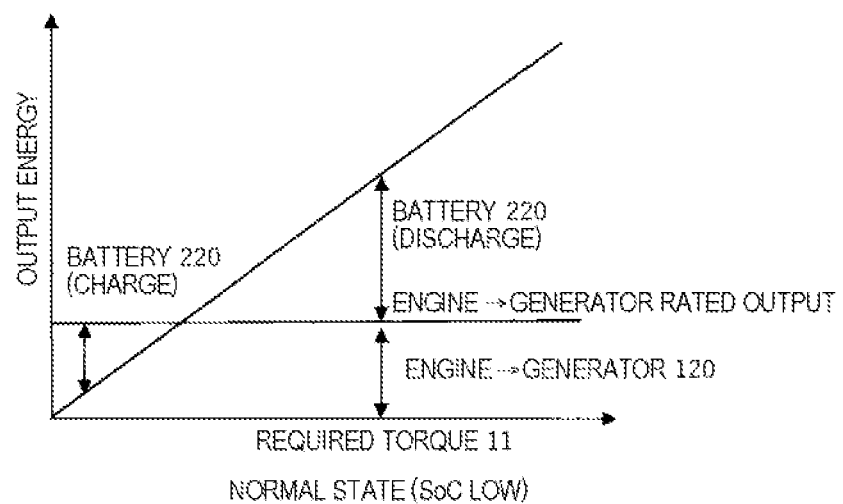
FIG. 23 illustrates an example of operation of a range extender.
Figure 24:
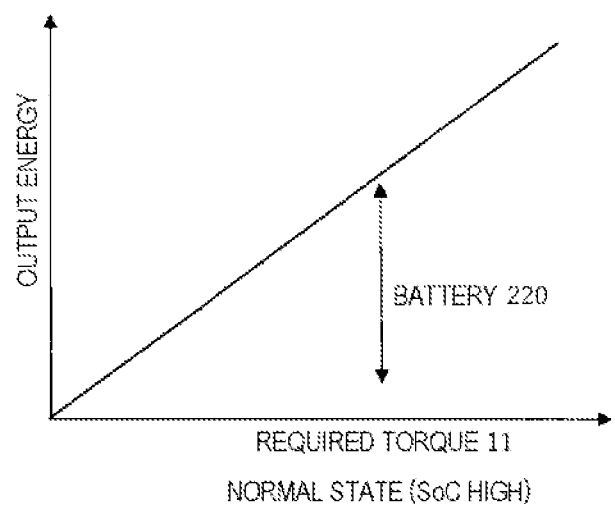
FIG. 24 illustrates an example of operation of a range extender.

FIGS. 23 to 26 are examples of the operation of the range extender. In a normal state, when the SoC of the battery 220 is low, power is generated by the engine-generator 120 as illustrated in FIG. 23, but when the SoC is high, control is performed to output output energy (torque) from the hybrid transmission unit 300 by power energy from the battery 220 as illustrated in FIG. 24.

Figure 25:
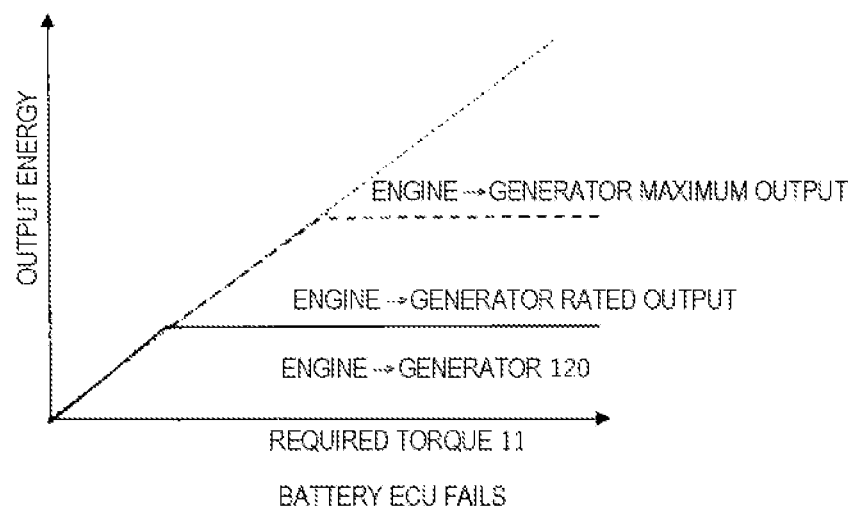
FIG. 25 illustrates an example of operation of a range extender.

When the battery 220 or the ECU 10-2 fails, as illustrated in FIG. 25, control is performed such that output energy (torque) is output from the hybrid transmission unit 300 by the power energy from the engine-generator 120 according to the required torque 11. In this case, since the battery 220 cannot absorb the regenerative power, energy is absorbed by a mechanical brake or an engine brake using the engine 121 at the time of braking. For safety, braking by a mechanical brake with simple control is desirable.

Figure 26:
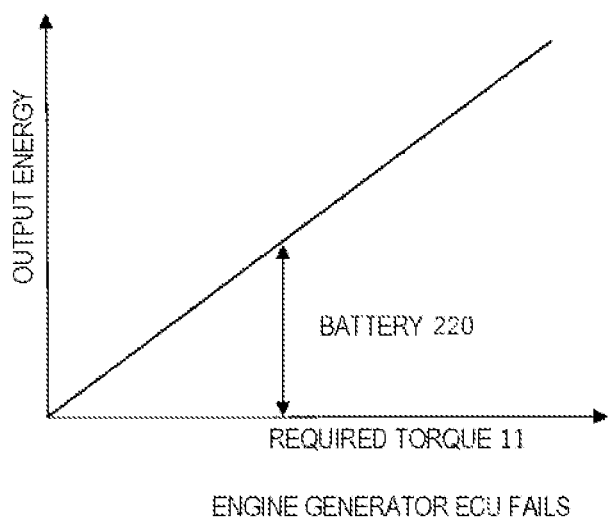
FIG. 26 illustrates an example of operation of a range extender.

When engine-generator 120 or the ECU 10-1 fails, as illustrated in FIG. 26, control is performed such that output energy (torque) is output from the hybrid transmission unit 300 by the power energy from the battery 220 according to the required torque 11. In this case, since the regenerative power can be absorbed by the battery 220, the regenerative braking by the motor 321 and the mechanical brake are cooperatively operated at the time of braking to generate the braking torque. For safety, braking by a mechanical brake with simple control is desirable.

Further, at the time of failure of the ECU 10-0, the ECU 10-1, the ECU 10-2, the ECU 10-3*a*, and the ECU 10-3*b* may determine and perform an operation fixed to either one of FIGS. 25 and 26, respectively, based on the required torque instructed by the automatic driving control unit 1 in the automatic driving vehicle and by an accelerator pedal opening degree of the driver in the conventional manual driving vehicle.

Sixth Embodiment

Sixth embodiment of the present invention will be described with reference to FIG. 27. Description of configurations similar to those of the first embodiment to the fifth embodiment will be omitted.

In the first embodiment described above, the ECU 10-3 that controls the hybrid transmission unit 300 is configured to be the redundant ECU 10-3*a* and the ECU 10-3*b*, whereas in the present embodiment, there is a difference in that the ECU 10-3 that controls the hybrid transmission unit 300 is not made redundant, and the hybrid transmission unit 300 is controlled, at the time of failure of the ECU 10-3, by the ECU 10-1 that originally controls the power (energy) source 100 or the ECU 10-2 that originally controls the power (energy) source 200, to realize fail-operational.

Figure 27:
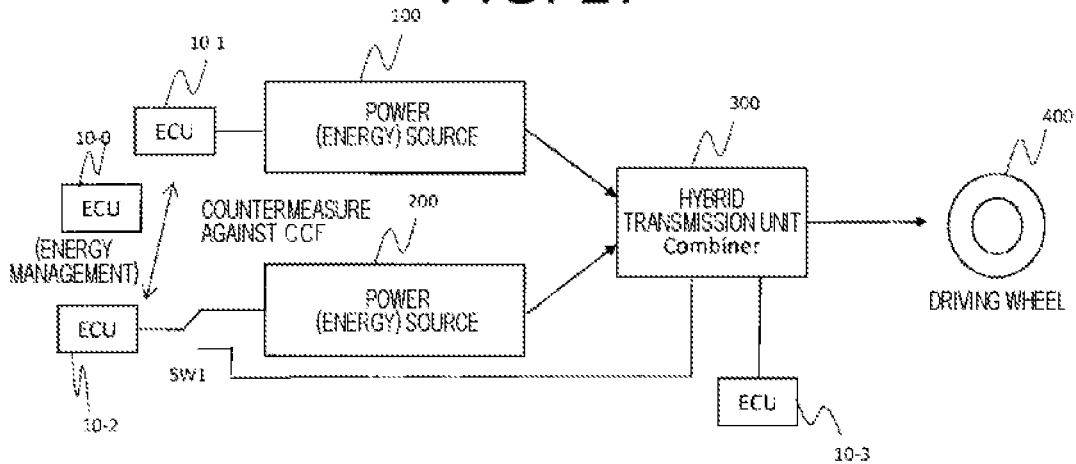
FIG. 27 illustrates a second basic embodiment of the present invention.

As illustrated in FIG. 27, in the present embodiment, the ECU 10-3 is made fail-operational (operation can be continued at the time of failure) without being made redundant. Specifically, as illustrated in FIG. 27, in addition to the ECU 10-3 that originally controls the hybrid transmission unit 300, a path in which the ECU 10-2 that originally controls the power (energy) source 200 controls the hybrid transmission unit 300 is provided, and when the ECU 10-3 fails, the connection destination of the ECU 10-2 is switched by SW1, so that the ECU 10-2 that originally controls the power (energy) source 200 controls the hybrid transmission unit 300.

When the ECU 10-3 fails, the ECU 10-2 switches its function to implement the function of the ECU 10-3. The ECU 10-0 transmits a control command to the ECU 10-1 and the ECU 10-2 so as to control the driving wheel 400 by the power of the power (energy) source 100.

In the present embodiment, focusing on the redundancy in the hybrid system in which the vehicle can be driven if either the power 100 or the power 200 can be driven, when the ECU 10-3 that controls the hybrid transmission unit 300 fails, the hybrid transmission unit 300 is controlled using either the ECU 10-1 or the ECU 10-2, so that the ECU 10-3 that is a control device that controls the hybrid transmission unit 300 can be realized without redundancy. According to the present embodiment, it is possible to achieve a fail operation while reducing system cost.

Further, as a further preferable example, an ECU 10-4 which is a control unit for controlling energy input from the power 100 and the power 200 to the hybrid transmission unit 300 is provided, and when the ECU 10-3 fails, the ECU 10-4 performs control to turn off the energy transmission to the driving wheel to the hybrid transmission unit 300. When the ECU 10-1 or the ECU 10-2 is switching the function to substitute for the ECU 10-3, sudden braking may occur from the power source 100 or 200, and there is a possibility of giving the driver anxiety. However, by controlling the energy transmission of the hybrid transmission unit 300 to be turned off by the ECU 10-4, it is possible to suppress the sudden braking from being transmitted to the driving wheel. Therefore, smooth switching can be realized, which is more preferable.

Note that a detailed embodiment of relay, clutch, and solenoid valve control for motor drive for prevention of unnecessary sudden braking and protection coordination will be described in eleventh embodiment.

Seventh Embodiment

Seventh embodiment of the present invention will be described with reference to FIGS. 28 to 32. The seventh embodiment is an embodiment in which the invention described in the sixth embodiment is applied to a parallel hybrid drive system. Description of configurations similar to those of the second embodiment and the sixth embodiment will be omitted.

Figure 28:
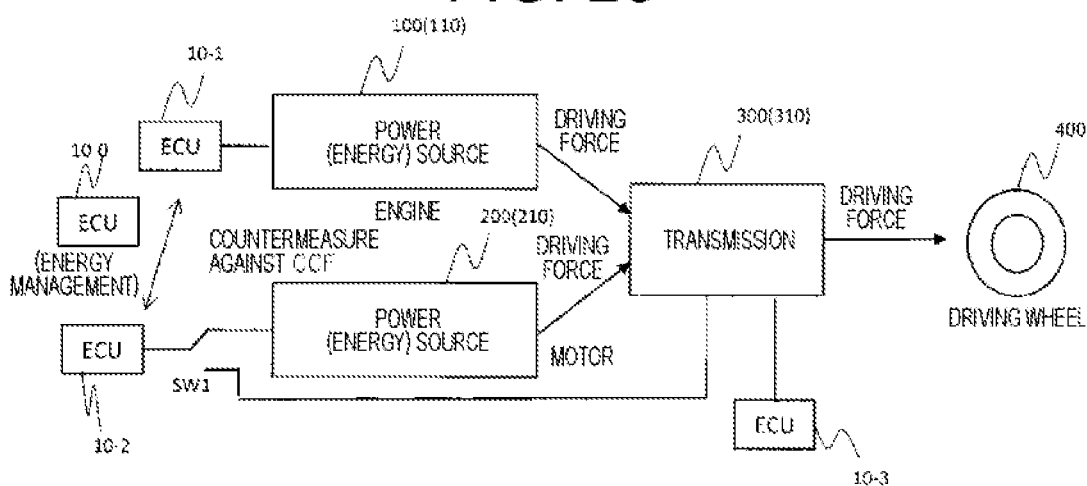
FIG. 28 illustrates an embodiment of a parallel hybrid drive system.

As illustrated in FIG. 28, the vehicle control system according to the present embodiment includes an engine 110 as a power (energy) source 100, a power (energy) source 210 including a motor as a power (energy) source 200, and a transmission 310 as a hybrid transmission unit 300.

In addition to the ECU 10-3 that controls the transmission 310 in the normal state, the ECU 10-2 that controls the motor 210 as the power (energy) source 200 in the normal state is connected to the transmission 310 as the hybrid transmission unit 300. The ECU 10-2 includes a route for controlling the transmission 310 in addition to the route for controlling the motor 210, and the connection destination can be changed by the SW1. The ECU 10-2 controls the transmission 310 when the ECU 10-3 fails. Note that the method of changing the control destination is not limited to the SW1, and various methods such as changing the transmission address can be considered.

In the case of the parallel hybrid, which of the ECUs 10-1 and 10-2 should be substituted for the function at the time of failure of the ECU 10-3 that controls the transmission 310 in the normal state cannot be determined unconditionally.

As one method, a method of determining based on a state of charge (SoC) of a battery or a remaining amount of fuel is considered. When the state of charge (SoC) of the battery at the time of failure of the ECU 10-3 is sufficiently high and the remaining amount of fuel is small, the function of the ECU 10-3 may be substituted by the ECU 10-1 that controls the engine 100 (110). When the state of charge (SoC) of the battery is low and the remaining amount of fuel is sufficient, the function of the ECU 10-3 may be substituted by the ECU 10-2 that controls the motor 200 (210). However, this method requires an extra selector switch, wiring (network), a program file to be executed, and a memory so that both of the ECUs 10-1 and 10-2 can substitute the function of the ECU 10-3, leading to an increase in cost.

As another method, usually, since there are many cases where the remaining amount of fuel is larger than the state of charge (SoC) of the battery, a method is conceivable in which the function of the ECU 10-3 is always substituted by the ECU 10-2 that controls the motor 200 (210) at the time of failure of the ECU 10-3.

According to this method, the ECU 10-2 only needs to be able to substitute the function of the ECU 10-3, so that the selector switch, the wiring (network), and the program file to be executed can be reduced as compared with the former, and the cost can be reduced.

Figure 29:
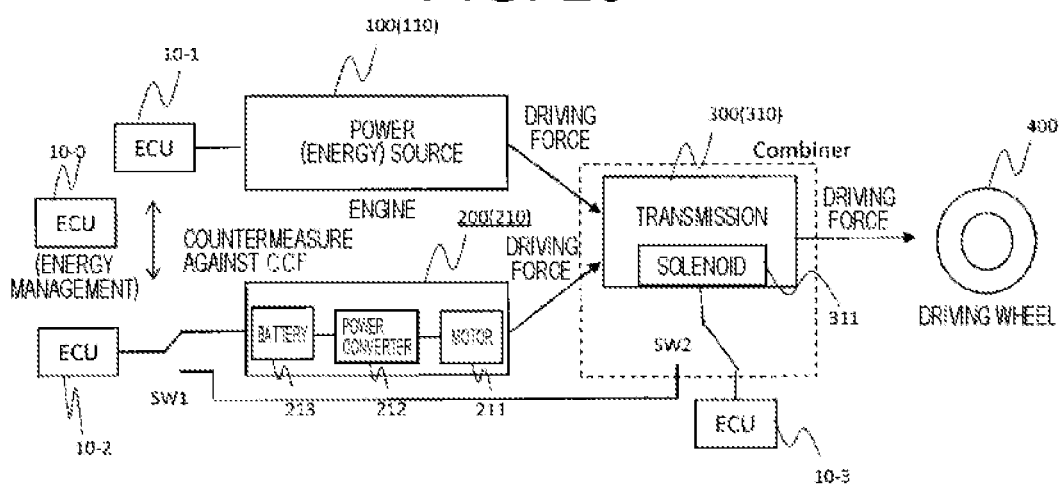
FIG. 29 illustrates an embodiment of a parallel hybrid drive system.

As illustrated in FIG. 29, in the case of a single system where the solenoid 311 that drives a hydraulic valve of the transmission 310 is not redundant, the solenoid 311 is driven by control signals from the ECU 10-3 and the ECU 10-2 via the OR or selector circuit SW2.

Figure 30:
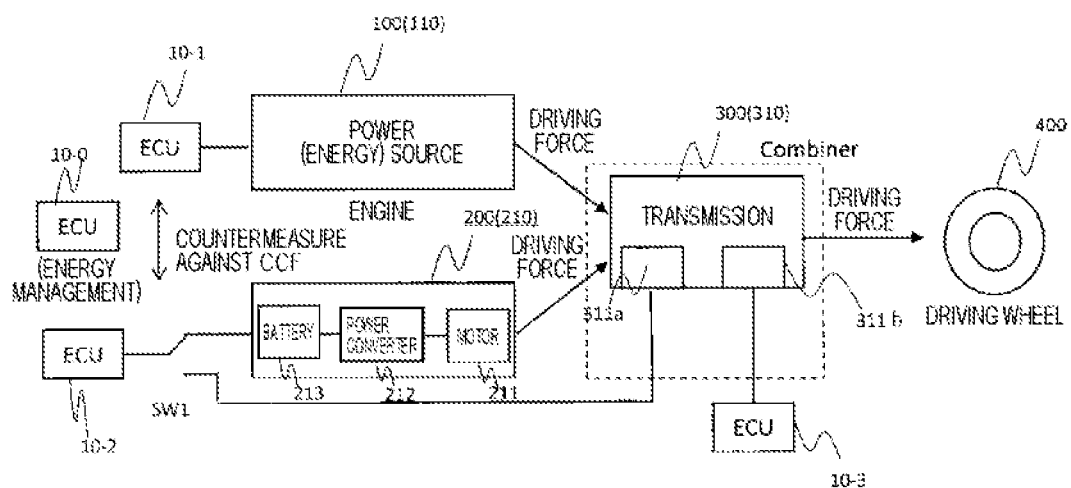
FIG. 30 illustrates an embodiment of a parallel hybrid drive system.

On the other hand, as illustrated in FIG. 30, when the solenoids 311a and 311b are redundantly provided, the ECU 10-3 can drive the solenoid 311b, and ECU 10-2 can drive the solenoid 311a. Note that an OR or selector circuit can be configured by a hydraulic circuit inside the transmission 310 (not illustrated). In a case where the transmission unit 300 is controlled by the ECU 10-2 that controls the power source 200 when the ECU 10-3 that controls the transmission 310 has failed, even if there are redundant control targets, the control target controlled by the ECU 10-1 or the ECU 10-2 does not operate when the ECU 10-3 is normal, and the control target controlled by the ECU 10-3 does not operate when the ECU 10-3 fails. Therefore, there is a possibility that the operation performance is deteriorated. Therefore, desirably, when the ECU 10-3 and the ECU 10-2 drive redundantly prepared control targets (the solenoids 311a and 311b) via the selector circuit SW2, both reliability and operation performance can be improved.

Figure 31:
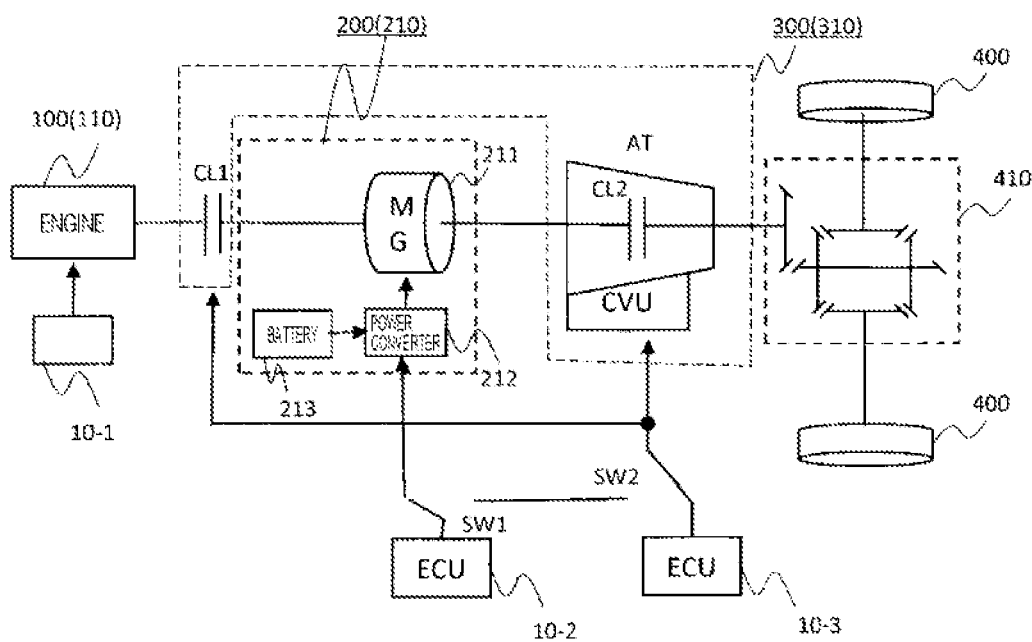
FIG. 31 illustrates a more detailed embodiment of a parallel hybrid drive system.

FIG. 31 illustrates an embodiment in which, in the parallel hybrid drive system illustrated in FIG. 5, another ECU substitutes the operation without making the ECU that controls the control valve unit CVU redundant.

Figure 32:
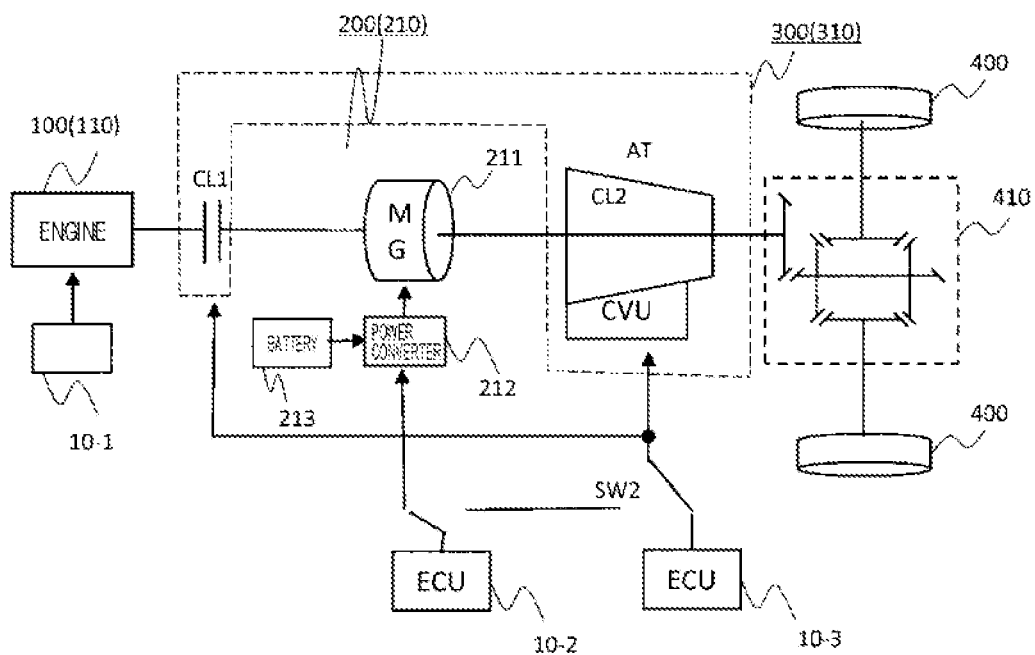
FIG. 32 illustrates a more detailed embodiment of a parallel hybrid drive system.
Figure 33:
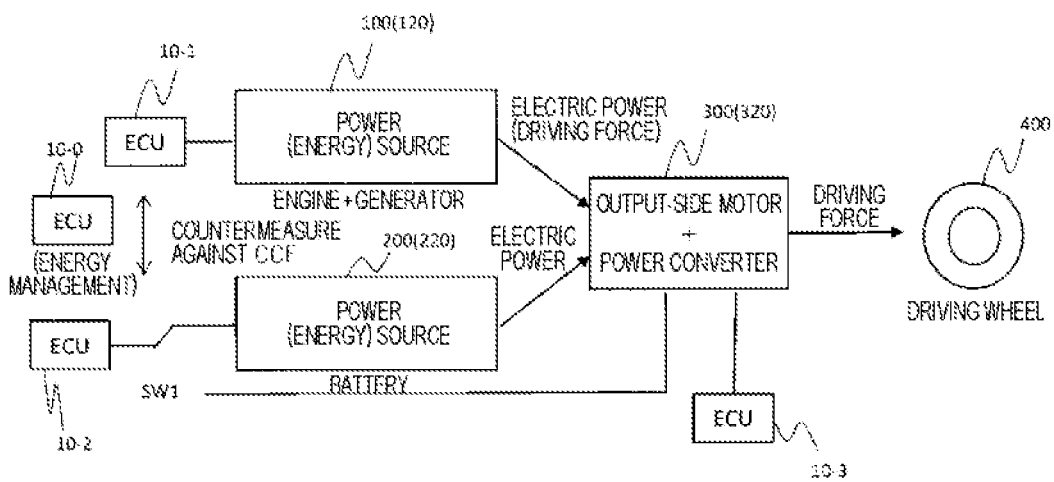
FIG. 33 illustrates an example of a series hybrid drive system and a series parallel hybrid drive system.

In the present embodiment, when the ECU 10-3 that originally controls the control valve unit CVU is normal, the ECU 10-3 controls the control valve unit CVU, and the ECU 10-2 controls the power converter 212. When the ECU 10-3 fails, the ECU 10-2 that originally controls the power converter 212 stops the control of the power converter 212 and controls the control valve unit CVU. As described above, according to the present embodiment, it is possible to control the automatic transmission AT via the control valve unit CVU by replacing the operation by another ECU without making the ECU that controls the control valve unit CVU redundant. As a result, even if the ECU 10-2 stops the control of the power converter 212 and stops the driving of the motor (or motor generator) 211, the driving wheel 400 can be driven by the driving force of the engine 100 (110) via the clutch CL1 and the automatic transmission AT. In addition, the clutch CL2 can be omitted as illustrated in FIG. 32, if the operation of generating electric power by the driving force motor (or motor generator) 211 of the engine 110 is not performed when the vehicle is stopped.

Eighth Embodiment

Eighth embodiment of the present invention will be described with reference to FIGS. 33 to 40. Description of configurations similar to those of the third embodiment and the sixth embodiment will be omitted. The present embodiment is an embodiment in which the present invention described in the sixth embodiment is applied to a series hybrid drive system or a series parallel hybrid drive system.

In the present embodiment, an engine-generator 120 is provided as a power (energy) source 100, a battery 220 is provided as a power (energy) source 200, and an output-side motor (+ power converter (inverter)) 320 is provided as a hybrid transmission unit 300. The engine-generator 120 includes an engine 121, a generator 122, and a power converter 123, and the output-side motor (+ power converter (inverter)) 320 includes an output-side motor (or motor generator) 321 and a power converter (inverter) 322.

Figure 34:
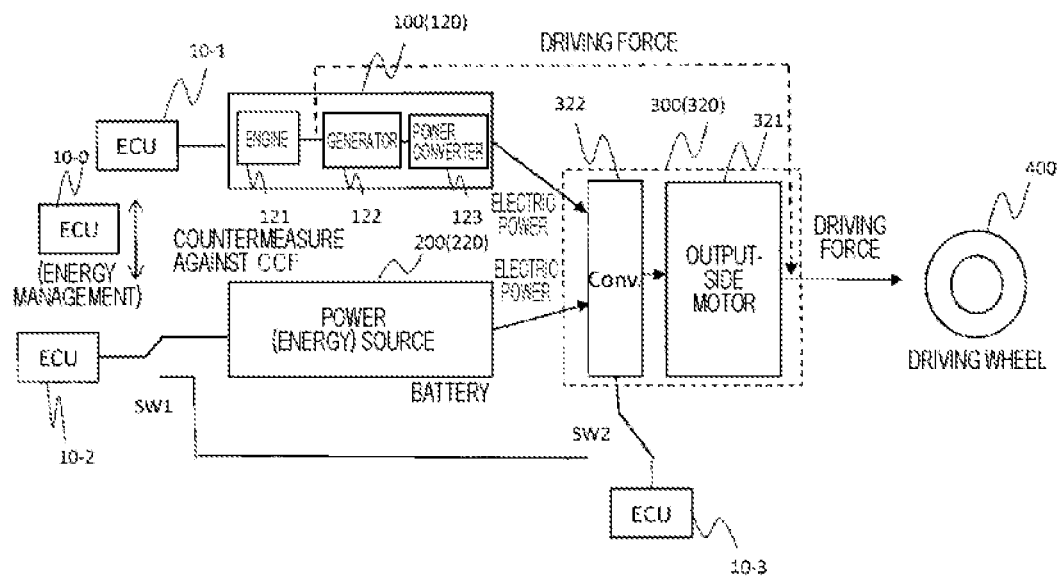
FIG. 34 illustrates an example of a series hybrid drive system and a series parallel hybrid drive system.

As illustrated in FIG. 34, in the case of a single system where the power converter (inverter) 322 that drives the output-side motor 321 is not redundant, the power converter (inverter) 322 is driven by control signals from the ECU 10-3 and the ECU 10-2 via OR or SW2.

Figure 35:
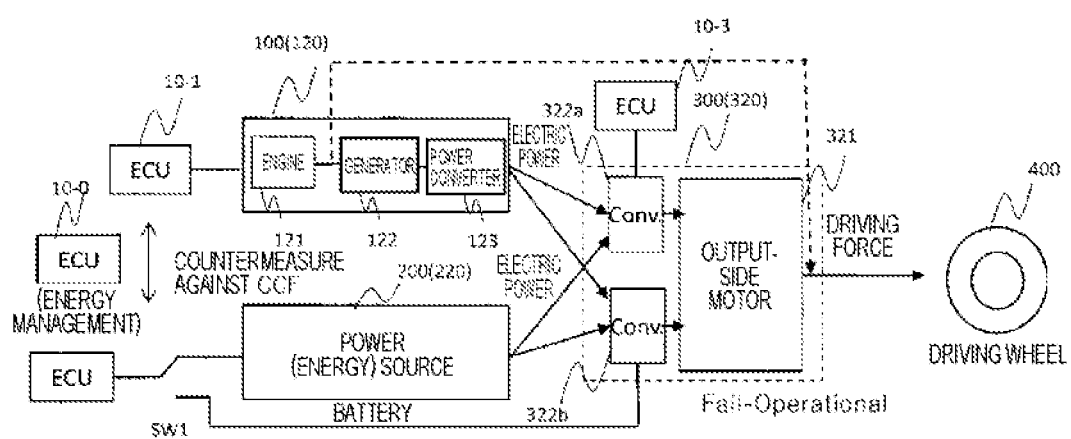
FIG. 35 illustrates an example of a series hybrid drive system and a series parallel hybrid drive system.

In addition, as illustrated in FIG. 35, in a case where hybrid transmission unit 300 is provided with the redundant power converters (inverters) 322a and 322b, the ECU 10-3 and ECU 10-2 drive the power converters (inverters) 322a and 322b, respectively. Note that windings inside the output-side motor 321 (not illustrated) can also be made redundant.

Comparing the embodiment of FIG. 34 with the embodiment of FIG. 35, since the power converters (inverters) 322a and 322b are also made redundant in the embodiment of FIG. 35, there is an advantage that the operation can be continued even against the failure of the power converter (inverter). However, since the power converter (inverter) 322a is used only when the ECU 10-3 is normal, and the power converter (inverter) 322b is used only when the ECU 10-3 is as described above and the ECU 10-2 substitutes the function thereof, the utilization efficiency of the power converter (inverter) is poor. On the other hand, in the embodiment of FIG. 34, since the ECU to be controlled is switched by the selector switch SW2, the power converter (inverter) 322 is always used whether the ECU 10-3 is normal or abnormal, and thus the utilization efficiency of the power converter (inverter) is good. In the embodiment illustrated in FIG. 9, the ECUs 10-3a and 10-3b simultaneously control the power converters (inverters) 322a and 322b in a normal state to enable parallel operation of outputs of the two power convertors, so that the utilization efficiency of the power converters (inverters) does not deteriorate.

Figure 36:
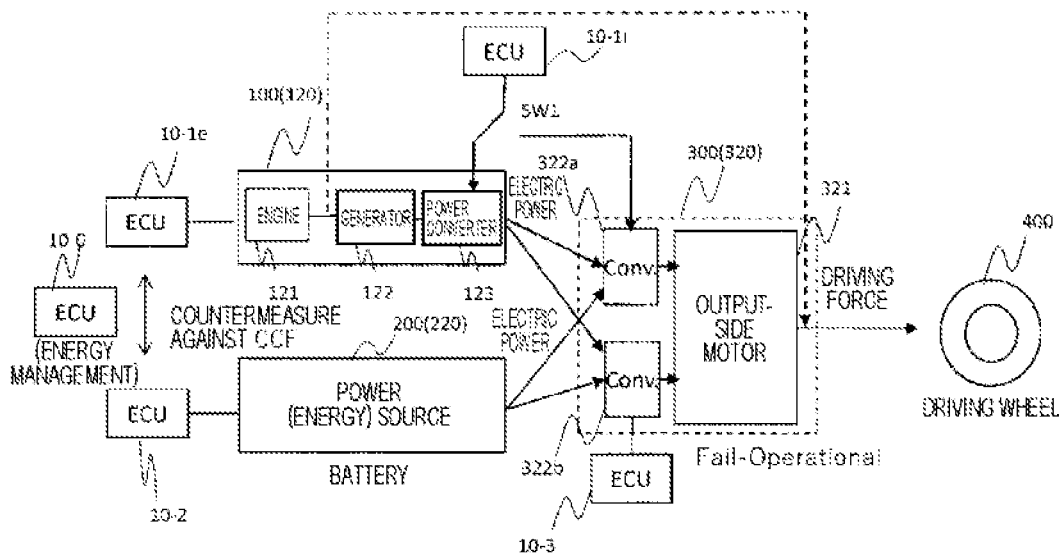
FIG. 36 illustrates an example of a series hybrid drive system and a series parallel hybrid drive system.

FIG. 36 illustrates an embodiment in which the ECU 10-1 and the ECU 10-3 control the power converters (inverters) 322a and 322b, respectively, to drive the output-side motor 321.

The ECU 10-1 and the ECU 10-3 respectively control the power converters (inverters) 322a and 322b to drive the output-side motor 321, the ECU 10-3 controls the power converter (inverter) 322b when the ECU 10-3 is normal, and the ECU 10-1 controls the power converter (inverter) 322a when the ECU 10-3 fails, to drive the output-side motor 321.

In the series hybrid system or the series parallel hybrid system, an advantage of controlling the hybrid transmission unit 300 by the ECU 10-1, which is a control device that controls the first power source 100 when the ECU 10-3 fails, is to shorten the switching time. This is because the control of the power converter 123 of the engine-generator 120, which is the first power source 100, and the control of the power converter (inverter) 322a included in the hybrid transmission unit 300 are extremely similar to each other, and thus, it is possible to control the power converter (inverter) 322a by the ECU 10-1 that originally controls the power converter 123 when the ECU 10-3 fails without switching a major function of the ECU 10-1. Note that, as illustrated in FIG. 34, even in a case where the power converter 322 is a single system, if the ECU 10-1 is configured to control the power converter 322 of the hybrid transmission unit 300 at the time of failure of the ECU 10-3, the same effect can be obtained as in the case where the power converter 322 described above is made redundant.

Figure 37:
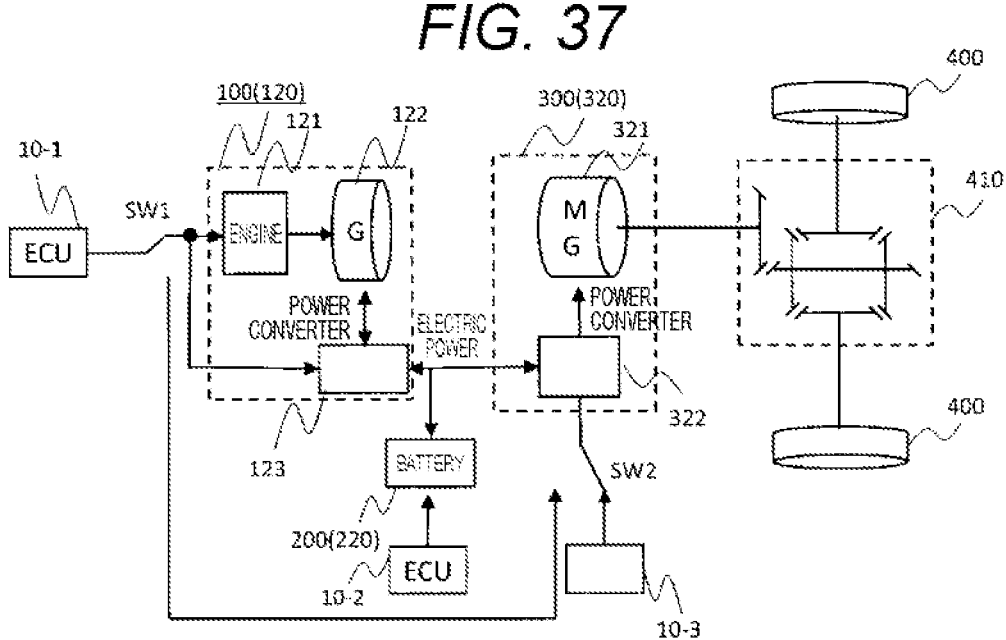
FIG. 37 illustrates a more detailed embodiment of a series hybrid drive system.

FIG. 37 is a more detailed embodiment in which the present invention is applied to the series hybrid drive system (including the range extender). A drive output shaft of the engine 121 is mechanically connected to the generator 122, and a power terminal of the generator 122 is connected to the battery 220 and the power converter (inverter) 322 via the power converter 123. The power converters (inverters) 322 converts power (direct current) from the power converter 123 and the battery 220 into three-phase alternating current power to drive the output-side motor (or motor generator) 321.

In the present embodiment, the ECU 10-1 and the ECU 10-3 control the power converters (inverters) 322 via the selector switch SW2 to drive the output-side motor 321, the ECU 10-3 controls the power converter (inverter) 322 when the ECU 10-3 is normal, and the ECU 10-1 controls the power converter (inverter) 322 when the ECU 10-3 fails, to drive the output-side motor 321.

Figure 38:
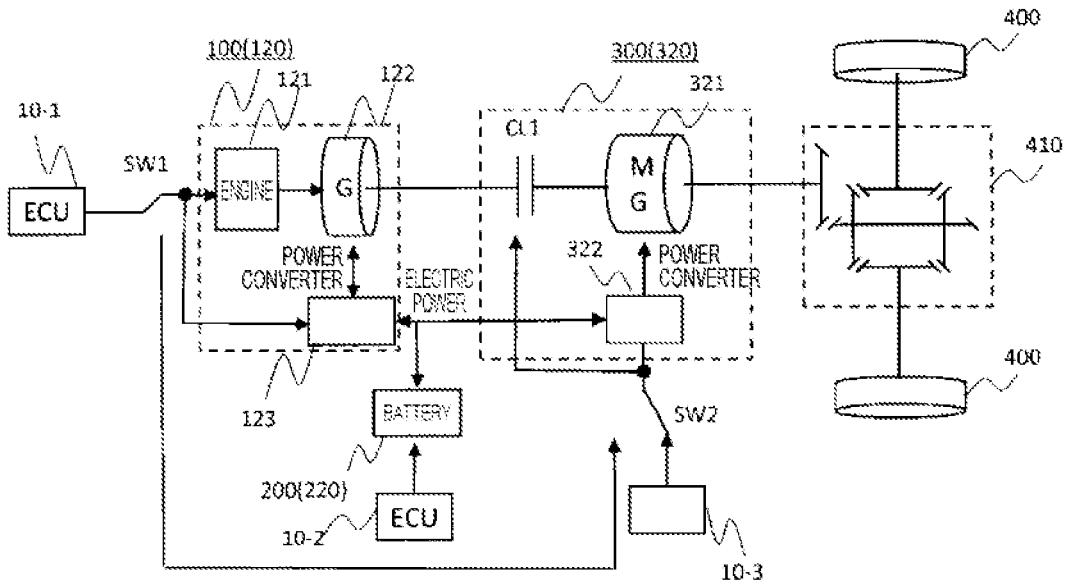
FIG. 38 illustrates a more detailed embodiment of a series hybrid drive system.

As illustrated in FIG. 38, by mechanically connecting a drive output shaft that mechanically connects the engine 121 and the generator 122 to a drive output shaft of the output-side motor (or motor generator) 321 via the clutch CL1, the drive output of the engine is directly transmitted to the driving wheel 400 at the time of high load, so that it is also possible to eliminate the conversion loss caused by once converting into electric power with the generator 122, the power converter 123, the power converter (inverter) 322, and the output-side motor (or motor generator) 321. Also in this case, the ECU 10-1 and the ECU 10-3 control the clutch CL1 via the selector switch SW2.

Figure 39:
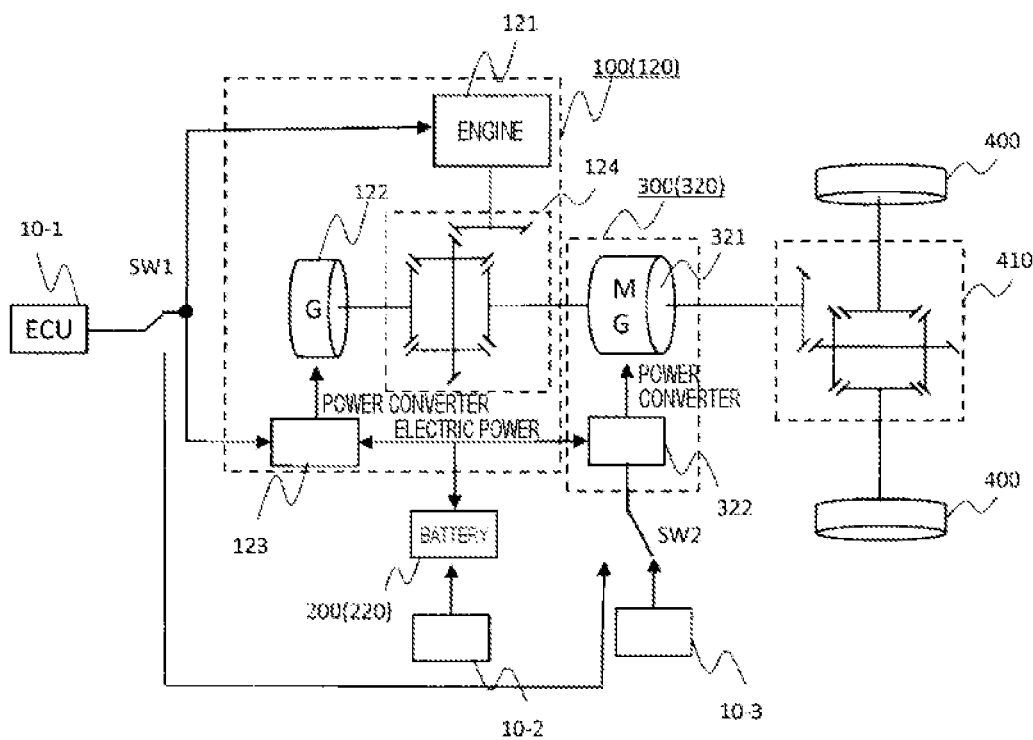
FIG. 39 illustrates a more detailed embodiment of a series parallel hybrid drive system.

FIG. 39 is a more detailed embodiment in which the present invention is applied to a series parallel hybrid drive system. Also in the present embodiment, the ECU 10-1 and the ECU 10-3 control the power converter (inverter) 322 via the selector switch SW2 to drive the output-side motor 321, the ECU 10-3 controls the power converter (inverter) 322 when the ECU 10-3 is normal, and the ECU 10-1 controls the power converter (inverter) 322 when the ECU 10-3 fails, to drive the output-side motor 321.

Figure 40:
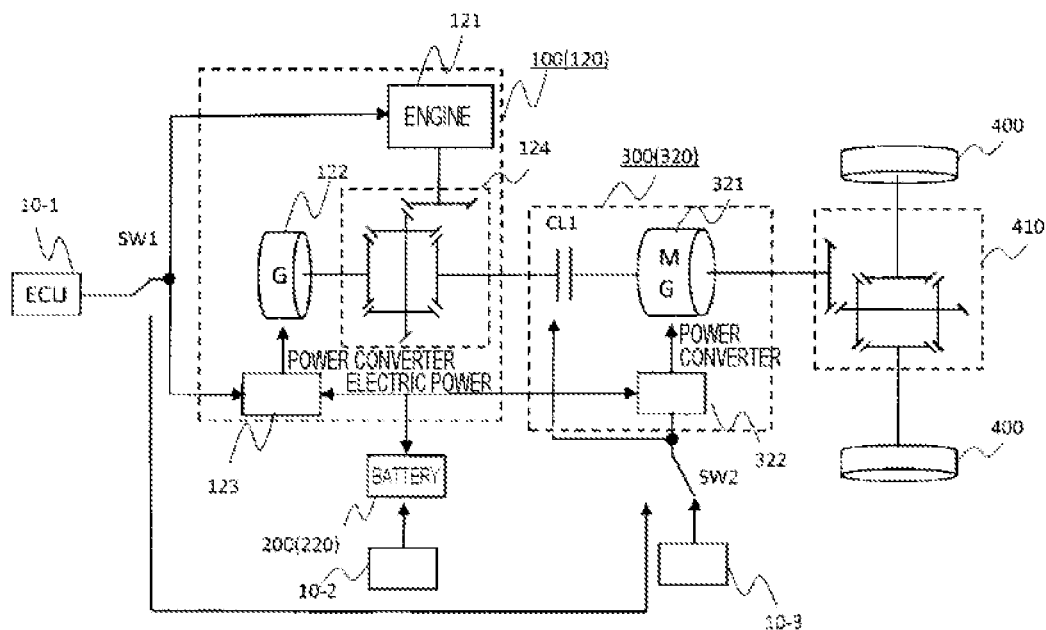
FIG. 40 illustrates a more detailed embodiment of a series parallel hybrid drive system.

Furthermore, as illustrated in FIG. 40, by mechanically connecting the power distribution mechanism 124 and the output shaft of the output-side motor (or motor generator)

321 via the clutch CL1, the engine 121 is disconnected by the clutch CL1 at high speed with a light load during cruise, so that it is possible to prevent the engine 121 from becoming a load and reduce the loss. Also in this case, the ECU 10-1 and the ECU 10-3 control the clutch CL1 via the selector switch SW2.

Ninth Embodiment

Ninth embodiment of the present invention will be described with reference to FIG. 41.

Figure 41:
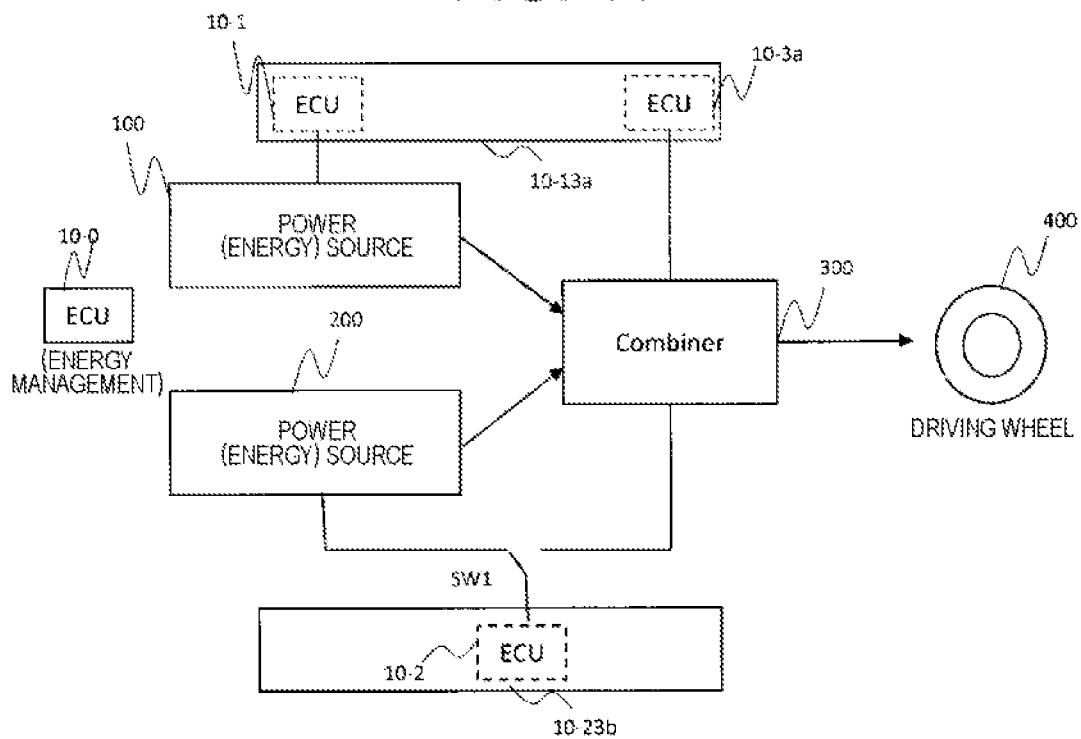
FIG. 41 illustrates an embodiment in which an ECU is integrated.

FIG. 41 illustrates an embodiment in which the ECUs are integrated, and is an embodiment in which the ECU 10-1 and the ECU 10-3 are configured by a common housing, a wiring board, a semiconductor chip, and the like. According to the present embodiment, since the ECU 10-1 and the ECU 10-2 are configured by separate housings, wiring boards, semiconductor chips, and the like, it is possible to reduce the occurrence of a common cause failure between both ECUs. Furthermore, since the ECU 10-3 and the ECU 10-2 that substitutes a function at the time of failure are also configured by separate housings, wiring boards, chips, and the like, it is possible to reduce the occurrence of a common cause failure between both ECUs, and to enhance the effect of redundancy.

Tenth Embodiment

Figure 42:
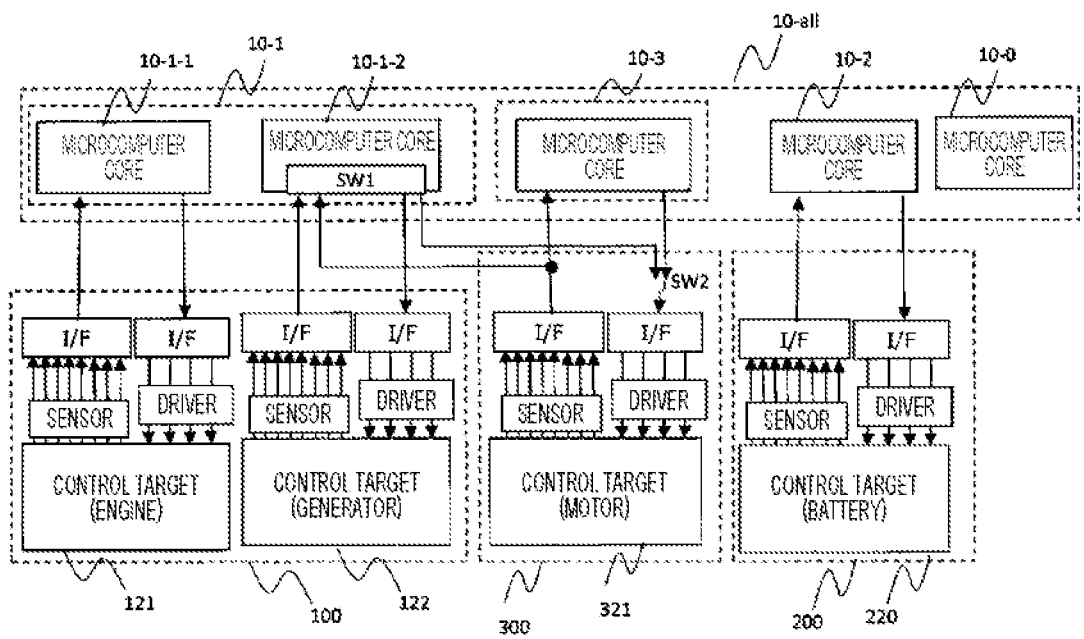
FIG. 42 illustrates a detailed embodiment in which an ECU is integrated.

Tenth embodiment of the present invention will be described with reference to FIG. 42. FIG. 42 illustrates an embodiment in which the ECUs 10-1 to 3 that control the series hybrid are integrated into an integrated ECU 10-all.

When a microcomputer core 10-3 constituting the ECU 10-3 is normal, microcomputer cores 10-1-1 and 2 constitute the ECU 10-1 and control the power (energy) source 100. Specifically, the microcomputer core 10-1-1 controls the engine 121, and the microcomputer core 10-1-2 controls the generator 122. Similarly, the microcomputer core 10-2 constitutes the ECU 10-2 and controls the battery 210 which is the power (energy) source 200. Further, the microcomputer core 10-3 constitutes the ECU 10-3 and controls the output-side motor 321 which is the transmission unit 300.

When the microcomputer core 10-3 fails, the microcomputer core 10-1-2 stops the control of the generator 122 and controls the output-side motor 321, which is the transmission unit 300, instead of the microcomputer core 10-3.

It is desirable that the ECUs 10-1, 2, and 3 and sensors and drivers connected to the engine 121, the generator 122, the battery 210, and the transmission unit 300 to be controlled are connected by a network via an interface (I/F). In the case of not connected by a network, the selector switch SW2 is required for each wiring connected to the engine 121, the generator 122, the battery 210, and the transmission unit 300 to be controlled, but the number of wirings to be switched by SW2 can be greatly reduced by connecting by the network, as illustrated in FIG. 42.

As a method of mounting the microcomputer cores constituting the ECUs 10-1, 2, and 3, the microcomputer cores 10-1-1 and 2 constituting the ECU 10-1 may have the same chip configuration. However, from the viewpoint of countermeasures against the same failure, it is desirable that the microcomputer core constituting the ECU 10-1 and the microcomputer core constituting the ECU 10-3 be separate chips, and similarly, it is desirable that the microcomputer core constituting the ECU 10-1 and the microcomputer core constituting the ECU 10-2 be separate chips.

Eleventh Embodiment

Figure 43:
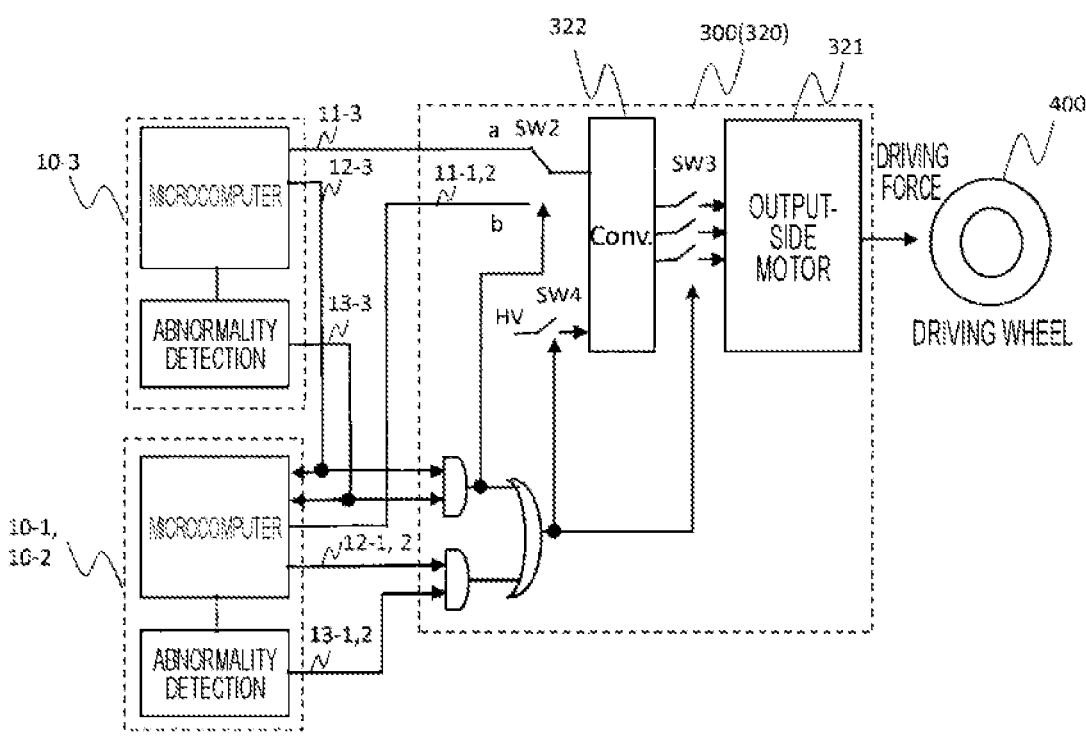
FIG. 43 illustrates an embodiment of output protection cooperation.
Figure 44:
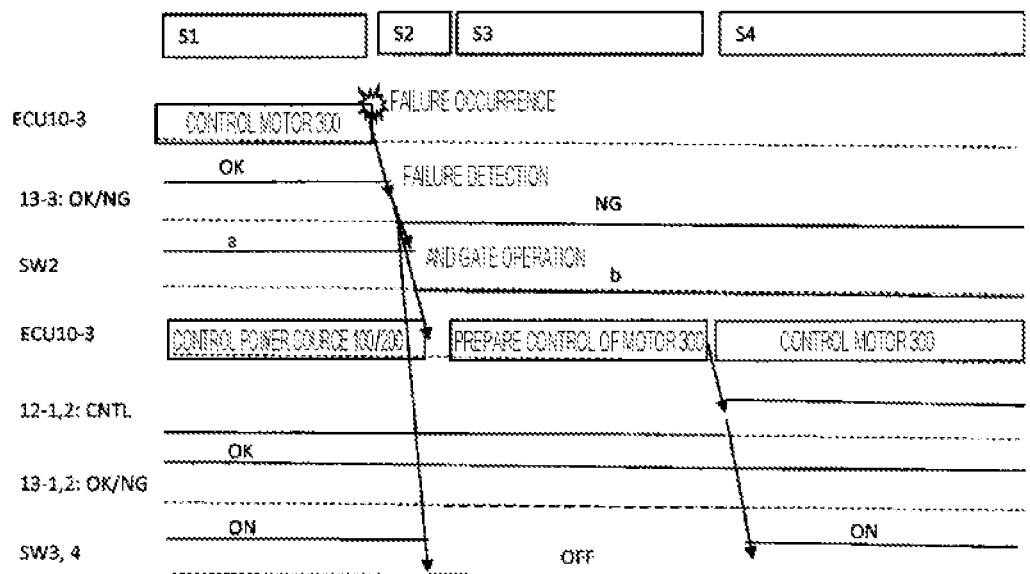
FIG. 44 illustrates an embodiment of output protection cooperation.

FIGS. 43 and 44 are embodiments of motor control for prevention of unnecessary sudden braking and protection coordination of control output. The microcomputers constituting the ECUs 10-1, 2, and 3 output the control mode signals CNTL 12-1, 2, and 3 in addition to the control outputs 11-1, 2, and 3, and abnormality detection means outputs abnormality detection results OK/NG 13-1, 2, and 3.

When the ECU 10-3 is normal and is in motor control mode (S1 in FIG. 44), the microcomputer constituting the ECU 10-3 outputs the motor control mode (H) as the control mode signal CNTL 12-3 while controlling the transmission unit 300 (motor 321), and outputs OK (H) as the abnormality detection result OK/NG 13-3 from the abnormality detection means. When a failure occurs in the ECU 10-3 (S2 in FIG. 44), the non-motor control mode (L) is output as the control mode signal. CNTL 12-3 when the microcomputer can detect the failure. Even when the microcomputer cannot detect the failure, the abnormality detection means outputs NG (L) as the abnormality detection result OK/NG 13-3.

The microcomputer constituting the ECU 10-1 or 2 constantly monitors the control mode signal CNTL 12-3 and the abnormality detection result OK/NG 13-3, and controls the originally assigned power (energy) source 100 or power (energy) source 200 when the control mode signal CNTL 12-3 is in the motor control mode (H) and the abnormality detection result OK/NG 13-3 is OK (H) (S1 in FIG. 44). When a failure occurs in the ECU 10-3 (S2 in FIG. 44) and the control mode signal CNTL 12-3 is in the non-motor control mode (L) or the abnormality detection result OK/NG 13-3 is NG (L), the control of the originally assigned power (energy) source 100 or power (energy) source 200 is stopped and preparation (specifically, downloading, initialization, and the like of the program) for control of the transmission unit 300 (motor 321) is started (S3 in FIG. 44).

After the preparation for the control of the transmission unit 300 (motor 321) is completed, the ECU 10-1 or 2 starts the control of the transmission unit 300 (motor 321), sets the control mode signal. CNTL 12-1 and 2 from the non-motor control mode (L) to the motor control mode (H), and when the ECU 10-1 or 2 is normal, the abnormality detection function outputs OK (H) as the abnormality detection results OK/NG 13-1 and 2 (S4 in FIG. 44).

SW2 that selects the control input to the converter 322 is controlled by the control mode signal CNTL 12-3 and the abnormality detection result OK/NG 13-3, or the control mode signals CNTL 12-1 and 2 and the abnormality detection results OK/NG 13-1 and 2, and operates to select the output of the ECU where either is H. In FIG. 43, when both the control mode signal CNTL 12-3 and the abnormality detection result OK/NG 13-3 are H, the control output 11-3 is selected.

SW3 that opens and closes phase output of the converter 322 and SW4 that controls power supply to the converter 322 are turned on when both the control mode signal CNTL 12-3 and the abnormality detection result OK/NG 13-3 are H or when both the control mode signals CNTL 12-1, 2 and the abnormality detection results OK/NG 13-1, 2 are H, and the converter 322 can drive the output-side motor 321. According to the embodiment as described above, the converter 322 can drive the output-side motor 321 only when the ECU 10-3 or any one of the ECUs 10-1 and 2 can drive the motor control mode, that is, the output-side motor 321, and the abnormality detection result OK/NG is ON, that is, normal, such that an abnormal ECU or an ECU not ready for motor control is configured not to control the converter 322 to drive the output-side motor 321.

Figure 45:
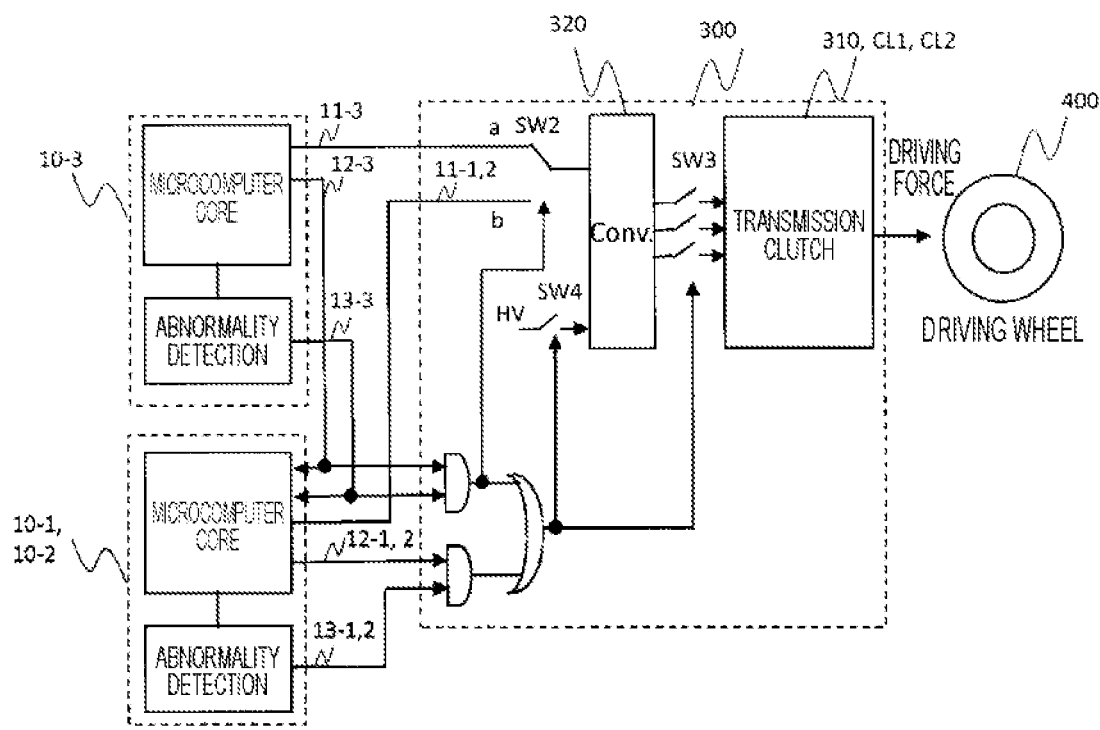
FIG. 45 illustrates an embodiment of output protection cooperation.

Although the embodiments of the protection coordination of the control output of the output-side motor 321 of the series hybrid or series parallel hybrid drive system have been described above, the parallel hybrid drive system is similarly controlled. For this purpose, as shown in FIG. 45, the power converter 322 may be replaced with the solenoid driver 320, and the output-side motor 321 may be replaced with the transmission 310 or the clutches CL1 and CL2.

As described above, according to the present invention, the control unit of the transmission unit that mixes the power (energy) from the different power (energy) sources included in the hybrid drive system and transmits the energy to the driving wheel has a redundant configuration, whereby the operation of the entire system can be continued even if any of the control units constituting the hybrid drive system fails. For example, even when one power (energy) source or a control unit of the power (energy) source fails, the operation can be continued by controlling the transmission unit to transmit energy to the driving wheel by power (energy) from the other power (energy) source. In addition, by providing an operation continuation function in case of failure to the control unit of the transmission unit that becomes a single point of failure of the entire system, the control of the transmission unit can be continued even if a failure occurs in the control unit of the transmission unit, and the operation of the entire system can be continued, that is, it becomes a fail operational.

By considering different power (energy) sources included in the hybrid drive system as redundant power (energy) sources, it is possible to realize a fail-operational hybrid drive system by minimizing redundancy without requiring further redundancy, and it is possible to achieve both implementation of operation continuity at the time of failure and cost reduction.

REFERENCE SIGNS LIST

100, 200 power (energy) source
300 hybrid transmission unit
400 driving wheel
10 electronic control unit ECU

The invention claimed is:

1. A vehicle control system configured to perform a vehicle control operation, the vehicle control system comprising:
   a transmission unit that transmits energy to a driving wheel;
   a first control unit that controls the transmission unit;
   a first source that inputs energy to the transmission unit;
   a second source that inputs energy to the transmission unit;
   a second control unit that controls the first source;
   a third control unit that controls the second source; and
   a fourth control unit that controls energy input from the first source and the second source to the transmission unit,
   wherein the energy input of the first source and the second source to the transmission unit comprises an amount of combined energy input;
   wherein when the first control unit fails, the fourth control unit transmits a command for the transmission unit to turn off energy transmission to the driving wheel at the time of function switching of the second or third control unit, and
   the second control unit or the third control unit transmits a command for the transmission unit to turn on the energy transmission to the driving wheel after the function is switched;
   and the vehicle control operation continues based upon the vehicle control system maintaining the amount of combined energy input to the transmission unit.

2. The vehicle control system according to claim 1, wherein
   the fourth control unit performs control to input only energy from the second source to the transmission unit when the first source or the second control unit fails, and
   performs control to input only energy from the first source to the transmission unit when the second source or the third control unit fails.

3. The vehicle control system according to claim 1, wherein
   a vehicle equipped with the vehicle control system is a series hybrid vehicle of which the transmission unit includes a motor and an inverter, the first source includes an engine and a generator, and the second source is a battery.

4. The vehicle control system according to claim 3, wherein
   the second control unit controls the transmission unit when the first control unit fails, and
   the transmission unit realizes turning off of energy transmission to the driving wheel by turning off a relay.

5. The vehicle control system according to claim 4, further comprising
   a control device including first, second, and third microcomputers,
   wherein the first control unit is implemented by the first microcomputer,
   the second control unit is implemented by the second microcomputer that controls an engine and the third microcomputer that controls a generator, and
   the third microcomputer controls the transmission unit when the first microcomputer fails.

6. The vehicle control system according to claim 5, wherein
   the first microcomputer and the third microcomputer are subjected to countermeasures against a common cause failure such as being driven by different power supply ICs.

7. The vehicle control system according to claim 1, wherein
   a vehicle equipped with the vehicle control system is a parallel hybrid vehicle of which the transmission unit is a transmission, the first source is an engine, and the second source includes a battery and a motor.

8. The vehicle control system according to claim 7, wherein
   the third control unit controls the transmission unit when the first control unit fails, and
   the transmission unit realizes turning off of energy transmission to the driving wheel by turning off a clutch.

9. The vehicle control system according to claim 1, wherein
   a vehicle equipped with the vehicle control system is a series parallel hybrid vehicle of which the transmission unit is a motor, the first source includes an engine and a generator, and the second source is a battery.

10. A vehicle control device mounted on a vehicle, the vehicle control device configured to perform a vehicle control operation, the vehicle control device comprising:

a transmission unit that transmits energy to a driving wheel;

a first control unit that controls the transmission unit;

a first source that inputs energy to the transmission unit;

a second source that inputs energy to the transmission unit;

a second control unit that controls the first source;

a third control unit that controls the second source; and a fourth control unit that controls energy input from the first source and the second source to the transmission unit, wherein the energy input of the first source and the second source to the transmission unit comprises an amount of combined energy input;

wherein when the first control unit fails, the fourth control unit transmits a command for the transmission unit to turn off energy transmission to the driving wheel at the time of function switching of the second or third control unit, and the second control unit or the third control unit transmits a command for the transmission unit to turn on the energy transmission to the driving wheel after the function is switched;

and the vehicle control operation continues based upon the vehicle control system maintaining the amount of combined energy input to the transmission unit.

11. The vehicle control device according to claim 1, wherein when the first control unit fails, the vehicle control device transmits a command for the transmission unit to turn off energy transmission to the driving wheel.

12. The vehicle control device according to claim 11, wherein when the vehicle control device is mounted on a series hybrid or series parallel hybrid vehicle of which the first source includes an engine and a generator, in a case where the first control unit fails, the vehicle control device transmits a command for the second control unit to control the transmission unit.

13. The vehicle control device according to claim 11, wherein when the vehicle control device is mounted on a parallel hybrid vehicle of which the transmission unit is a transmission, the first source is an engine, and the second source includes a battery and a motor, in a case where the first control unit fails, the vehicle control device transmits a command for the third control unit to control the transmission unit.

14. The vehicle control device according to claim 10, wherein the vehicle control device controls energy input from the first source and the second source to the transmission unit, and when the first control unit fails, performs control so that energy is input to the transmission unit only by the second source.

* * * * *